United States Patent [19]

Kim et al.

[11] Patent Number: 5,581,777
[45] Date of Patent: Dec. 3, 1996

[54] PARALLEL PROCESSOR MEMORY TRANSFER SYSTEM USING PARALLEL TRANSFERS BETWEEN PROCESSORS AND STAGING REGISTERS AND SEQUENTIAL TRANSFERS BETWEEN STAGING REGISTERS AND MEMORY

[75] Inventors: Won S. Kim, Fremont; David M. Bulfer, Mountain View; John R. Nickolls, Los Altos; W. Thomas Blank, Palo Alto; Hannes Figel, Milpitas, all of Calif.

[73] Assignee: MasPar Computer Corporation, Sunnyvale, Calif.

[21] Appl. No.: 400,411

[22] Filed: Mar. 3, 1995

Related U.S. Application Data

[63] Continuation of Ser. No. 159,916, Nov. 30, 1993, abandoned, which is a continuation of Ser. No. 461,567, Jan. 5, 1990, abandoned.

[51] Int. Cl.⁶ .......................... G06F 15/76; G06F 13/38
[52] U.S. Cl. ............................. 395/800; 395/481
[58] Field of Search ............................ 395/375, 425, 395/800, 427, 481

[56] References Cited

U.S. PATENT DOCUMENTS

| | | |
|---|---|---|
| 3,800,289 | 3/1974 | Batcher . |
| 3,812,467 | 5/1974 | Batcher . |
| 3,863,233 | 1/1975 | Eddey et al. . |
| 3,936,806 | 2/1976 | Batcher . |
| 3,987,419 | 10/1976 | Morrill et al. . |
| 4,314,349 | 2/1982 | Batcher ................... 364/716 |
| 4,316,244 | 2/1982 | Grondalski . |
| 4,447,877 | 5/1984 | Grondalski . |
| 4,462,073 | 7/1984 | Grondalski . |
| 4,481,580 | 11/1984 | Martin et al. ................ 395/325 |
| 4,591,981 | 5/1986 | Kassabou .................. 395/800 |
| 4,598,400 | 7/1986 | Hillis ........................... 370/60 |

(List continued on next page.)

FOREIGN PATENT DOCUMENTS

| | | |
|---|---|---|
| 0179401 | 10/1985 | European Pat. Off. . |
| WO87/05418 | 9/1987 | WIPO . |
| 88/06764 | 7/1988 | WIPO . |

OTHER PUBLICATIONS

Comcon 90 26 Feb. 1990, San Francisco, CA, US pp. 20–24 XP146160 Tom Blank "The Maspar MP–1 architecture" * the whole document *.

(List continued on next page.)

*Primary Examiner*—Richard L. Ellis
*Attorney, Agent, or Firm*—Skjerven, Morrill, MacPherson, Franklin & Friel

[57] ABSTRACT

A massively parallel processor is provided with a plurality of clusters. Each cluster includes a plurality of processor elements ("PEs") and a cluster memory. Each PE of the cluster has associated with it an address register, a stage register, an error register, a PE enable flag, a memory flag, and a grant request flag. A cluster data bus and an error bus connects each of the stage registers and error registers of the cluster to the memory. The grant request flags of the cluster are interconnected by a polling network, which polls only one of the grant request flags at a time. In response to a signal on the polling network and the state of the associated memory flag, the grant request flag determines an I/O operation between the associated data register and the cluster memory over the cluster data bus. Both data and error bits are associated with respective processor elements. The sequential memory operations proceed in parallel with parallel processor operations. The sequential memory operations also may be queued. Addressing modes include direct and indirect. In direct address mode, a PE addresses its own address space by appending its PE number to a broadcast partial address. The broadcast partial address is furnished over a broadcast bus, and the PE number is furnished on a cluster address bus. In indirect address mode, a PE addresses either its own address space or that of other PEs in its cluster by locally calculating a partial address, then appending to it either its own PE number or that of another PE in its cluster. The full address is furnished over the cluster address bus.

8 Claims, 17 Drawing Sheets

U.S. PATENT DOCUMENTS

| | | | |
|---|---|---|---|
| 4,709,327 | 11/1987 | Hillis et al. | |
| 4,719,621 | 1/1988 | May | 370/85 |
| 4,773,038 | 9/1988 | Hillis et al. | |
| 4,783,738 | 11/1988 | Li et al. | |
| 4,791,641 | 12/1988 | Hillis | 371/38 |
| 4,797,815 | 1/1989 | Moore | 395/325 |
| 4,805,091 | 2/1989 | Thiel et al. | |
| 4,805,173 | 2/1989 | Hillis et al. | 371/37 |
| 4,827,403 | 5/1989 | Steele, Jr. et al. | |
| 4,852,048 | 7/1989 | Morton | |
| 4,860,249 | 8/1989 | Nicely et al. | 395/800 |
| 4,873,626 | 10/1989 | Gifford | 395/325 |
| 4,891,787 | 1/1990 | Gifford | 395/375 |
| 4,980,854 | 12/1990 | Donaldson et al. | 395/325 |
| 5,010,476 | 4/1991 | Davis | 395/325 |
| 5,060,186 | 10/1991 | Barbagelata et al. | 395/425 |
| 5,165,023 | 11/1992 | Gifford | |

OTHER PUBLICATIONS

Comcon 90 26 Feb. 1990, San Francisco, CA, US pp. 73–81 XP146168 Creve Marple "Merlin: the superglue for multi-computer systems" * the whole document *.

Proceeding of the 1989 International Conference on Parallel Processing, vol. 1, 8 Aug. 1989, The Pennsylvania State University Press, pp. 142–150, L. Wittie "Merlin: Massively Parallel Heterogeneous Computing".

Processing Supercomputing '89, 13 Nov. 1989, Reno, Nevada, U.S., pp. 476–484 XP90914 Y. K. Park "DASP: A General–Purpose Mimd Parallel Computer Using Distributed Associative Processing".

McLeod, J., "Look out, Cray: Here comes a super–priced supercomputer," Electronics, Aug. 1989, pp. 83–86.

Perry, T. et al., "Supercomputer experts predict expansive growth," IEEE Spectrum, Feb. 1989, pp. 26–33.

Stone, H., "Discrete Mathematical Structures and Their Applications", Science Research Associates, Inc., 1973, pp. 165–179.

PARALLEL PROCESSOR MEMORY TRANSFER SYSTEM USING PARALLEL TRANSFERS BETWEEN PROCESSORS AND STAGING REGISTERS AND SEQUENTIAL TRANSFERS BETWEEN STAGING REGISTERS AND MEMORY

This application is a continuation of application Ser. No. 08/159,916, filed Nov. 30, 1993, which is a continuation of application Ser. No. 07/461,567, filed Jan. 05, 1990 both now abandoned.

CROSS REFERENCE TO RELATED APPLICATIONS

The following commonly-assigned patent applications, which are filed on even date herewith, are hereby incorporated herein by reference: Nickolls et al., "Scalable Inter-Processor and Processor to I/O Messaging System for Parallel Processing Arrays, " Ser. No. 07/461,492, Taylor, "Network and Method for Interconnecting Router elements Within Parallel Computer System," Ser. No. 07/467,572, and Zapisek U.S. Pat. No. 5,313.590, "Router Chip with Quad-Crossbar and Hyperbar Personalities" Ser. No. 07/461,551, now U.S. Pat. No. 5,434,977.

BACKGROUND OF THE INVENTION

1. Field of the Invention

This invention relates to data transfers systems for massively parallel processors, and more specifically to data addressing and the transfer of data between a number of SIMD parallel processors arranged in a cluster and a common cluster memory.

2. Background of the Invention

Parallel processors have been developed that are based on the concurrent execution of the same instruction by a large number of relatively simple "processor elements" operating on respective data streams. These processors, known as single instruction, multiple data ("SIMD") processors, are useful in such applications as image processing, signal processing, artificial intelligence, data base operations, and simulations.

Typically, a SIMD processor includes an array of processor elements and a routing network over which the results of calculations and operandi are communicated among the processor elements and input/output ("I/O") devices. The operations of the processor elements and of the routing network are controlled by a separate control processor, in response to instructions and data furnished from a computer subsystem.

A recent SIMD processor is described in U.S. Pat. No. 4,314,349, issued Feb. 2, 1982 to Batcher. A processing element constitutes the basic building block, and each processing element is connected to a uniquely associated random access memory by a bi-directional data bus. The data bus is the main data path for the processing element. During each machine cycle, one bit of data can be transferred from any one of six sources, viz. a bit read from RAM memory, the state of the B, C, P, or S register, or the state of an equivalence function. The destination of a data bit on the data bus may be one or more of, for example, the following: the address location in the RAM memory, the A, G, or S register, the logic associated with the P register, the input to a sum-OR tree, and the input to the parity tree. It will be appreciated that during a memory I/O operation, the bus is reserved for memory data and other operations requiring bus access may not proceed.

The SIMD processor described in U.S. Pat. No. 4,805, 173, issued Feb. 14, 1989 to Hillis et al. includes an error control and correction technique which operates across multiple processors and multiple computer memories. Each integrated circuit includes sixteen processors which are connected to an associated memory through a memory interface. The memory is in the form of 22 4K×1 bit RAMs. Each of 16 4K×1 slices functions as the memory for a different one of the 16 processors, and the remaining 6 4K×1 bit slices store parity or syndrome bits for the data stored in the memories of the 16 processors. Parallel data is read from or written to each integrated circuit at the address specified by an address decoder. In a memory read operation, the memory is read in parallel one row at a time to produce data outputs on 16 output lines and parity outputs on 6 additional output lines. These signals then are applied in parallel to error control circuitry for detection and correction of parity errors. In a memory write operation, data is written in parallel from the 16 processors into the 16 memory slices at the given address, and the 6 syndrome outputs are written into the 6 other memory slices at the same addresses and at the same time as the data used in generating the syndrome outputs are stored in the 16 memory slices. It will be appreciated that the error control and correction technique requires that all 16 memory slices be read or written in parallel.

A SIMD processor related to the Hillis et al. '173 processor appears in U.S. Pat. No. 4,791,641, issued Dec. 13, 1988 to Hillis. The error correction system of the Hillis patent treats data for plural memories associated with plural processors as a unitary data word, and generates an error code for the unitary data word. It will be appreciated that the error correction system contemplates that the unitary data word be read or written as a unit.

In parallel processor systems, the size of the memory per processor element tends to be small. Nonetheless, because of the great number of processor elements, the amount of memory required by a parallel processor is large. Unfortunately, memory such as SRAM with speeds comparable to that of even simple microprocessors tends to be expensive. Unfortunately, the less expensive memory such as DRAM is relatively slow and its use in a parallel processor would be expected to compromise performance by causing the processor elements to idle while the memory operation is completed.

SUMMARY OF THE INVENTION

The memory system architecture of our invention permits data transfer operations between memory and processors to proceed concurrently with parallel processing operations. Relatively slow discrete memory may be used without excessively degrading the overall speed of the parallel processor. In one embodiment having DRAMs, memory is utilized at or near the maximum memory bandwidth in both sequential page mode and random mode.

The memory system architecture of our invention provides for addressing by a processor element of its own memory space to be made in accordance with an address furnished to all processor elements by an array control unit, or computed locally by the processor element. Such addressing is possible even as to memory words that includes both data bits and error detection and correction bits.

These and other advantages are realized in the present invention, a memory system suitable for, for example, a parallel processor having a plurality of clusters, each having a plurality of processor elements. In one embodiment, each processor element has an enable flag. The memory system includes a number of memory flags, each associated with a respective processor element. The memory system also includes a number of stage registers, each associated with a respective processor element. A memory is provided, and a cluster data bus connects each of the stage registers of the cluster to the memory. In addition, a number of grant request flags interconnected in a polling network are provided. Each of the grant request flags is associated with a respective processor element and is responsive to a signal on the polling network and the state of the associated memory flag for determining I/O operation between the associated data register and the memory.

In one variation of the foregoing, a number of address registers are provided, each associated with a respective processor element. The address registers are connected to the memory over a cluster address bus, and each of the grant request flags is responsive to the polling network and to the state of the associated memory flag for determining an I/O operation between the associated data register and the memory in accordance with the contents of the associated address register.

In another variation, an address bus is connected to the memory from the array control unit of the parallel processor. Each of the grant request flags is responsive to the polling network and the state of the associated memory flag for determining an I/O operation between the associated data register and the memory in accordance with the contents of address bus. In yet another variation, an error bus is connected to the memory; and a number of error registers are provided. Each error register is associated with a respective processor element and is connected thereto and also to the error bus. Each of the grant request flags is responsive to the polling network and the state of the associated memory flag for determining an I/O operation between the associated error register and said memory.

In another embodiment of the memory system, a data bus of a preselected width is connected to each of the processor elements within a cluster. In addition, an error bus is connected to each of the processor elements within the cluster, and has a preselected width as well. A memory for the cluster also is provided, each word of which has a width equal to the sum of the width of the data bus and the error bus. An address bus for the cluster also is provided, wherein the cluster memory is responsive to a enable signal for performing an I/O operation on the data bus and on the error bus in accordance with the contents of the address bus. In one variation, the address bus is connected to each of the processor elements in the cluster. In another variation, the address bus is connected to an array control unit of the parallel processor. In these variations, the address bus may include an identification bus connected to each of the processor elements in the cluster. The identification bus can be driven by either a fixed or programmable register in each of the processor elements.

In another embodiment of the present invention, data is transferred in a parallel processor as follows. A common data path is provided between a cluster of processor elements and a cluster memory. Respective memory flags of the processor elements are evaluated in parallel, and the values of the memory flags are furnished to respective grant request flags. A polling signal is applied to a selected one of the grant request flags, which is responsive to the value of its respective memory flag and to the polling signal for determining an I/O operation between a data register associated with the selected grant request flag and the memory over the common data bus.

In one variation of the foregoing, an address is provided from an address register associated with the selected grant request flag to the memory over a common address bus connected to the memory. The selected grant request flag is responsive to the value of its respective memory flag and to the polling signal for determining an I/O operation between a data register associated with the selected grant request flag and the memory over the common data bus in accordance with the address provided. In another variation, an address is provided from a processor control unit to the memory over a broadcast bus. The selected grant request flag is responsive to the value of its respective memory flag and to the polling signal for determining an I/O operation between a data register associated with the selected grant request flag and the memory over the common data bus in accordance with the address provided.

BRIEF DESCRIPTION OF THE DRAWINGS

In the drawings, where like reference numerals indicate like parts.

DESCRIPTION OF THE PREFERRED AND OTHER EMBODIMENTS

Figure 1:
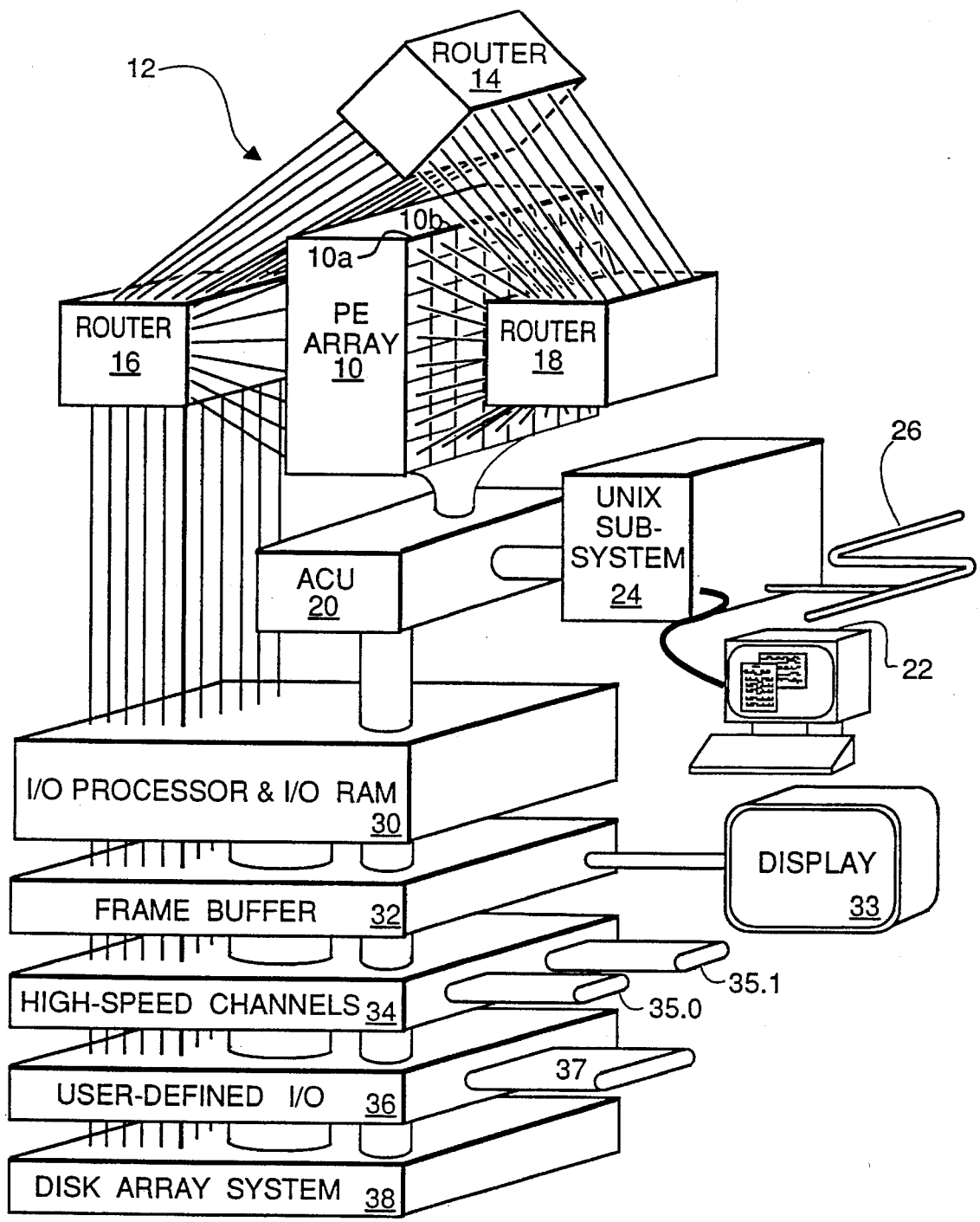
FIG. 1 is a diagrammatic view of a massively parallel processor which incorporates the present invention.

A massively parallel processor is illustrated in FIG. 1. At the heart of the parallel processor is a processor element array 10 having a number of individual processor elements located on processor element boards such as 10a and 10b. The parallel processor is configured with 1, 2, 4, 8, or 16 processor element boards as desired. The parallel processor is further provided with a router network 12 comprising routers 14, 16 and 18. A suitable router network is described in the aforementioned Application of Zapisek. The PE array 10 is under the control of an array control unit ("ACU") 20. Users interact with the parallel processor through a user console 22 connected to the ACU 20 through a UNIX® (Trademark)-operating system-based subsystem 24. The subsystem 24 communicates with other computers over ETHERNET® network 26. Input and output operations also are conducted over buses connecting ACU 20 to an I/O processor and I/O RAM memory 30, a frame buffer 32 and associated display 33, a high speed channel 34 and associated HSC interface lines 35.0 and 35.1, a user defined I/O 36 and associated interface line 37, and a disk array system 38.

Figure 2:
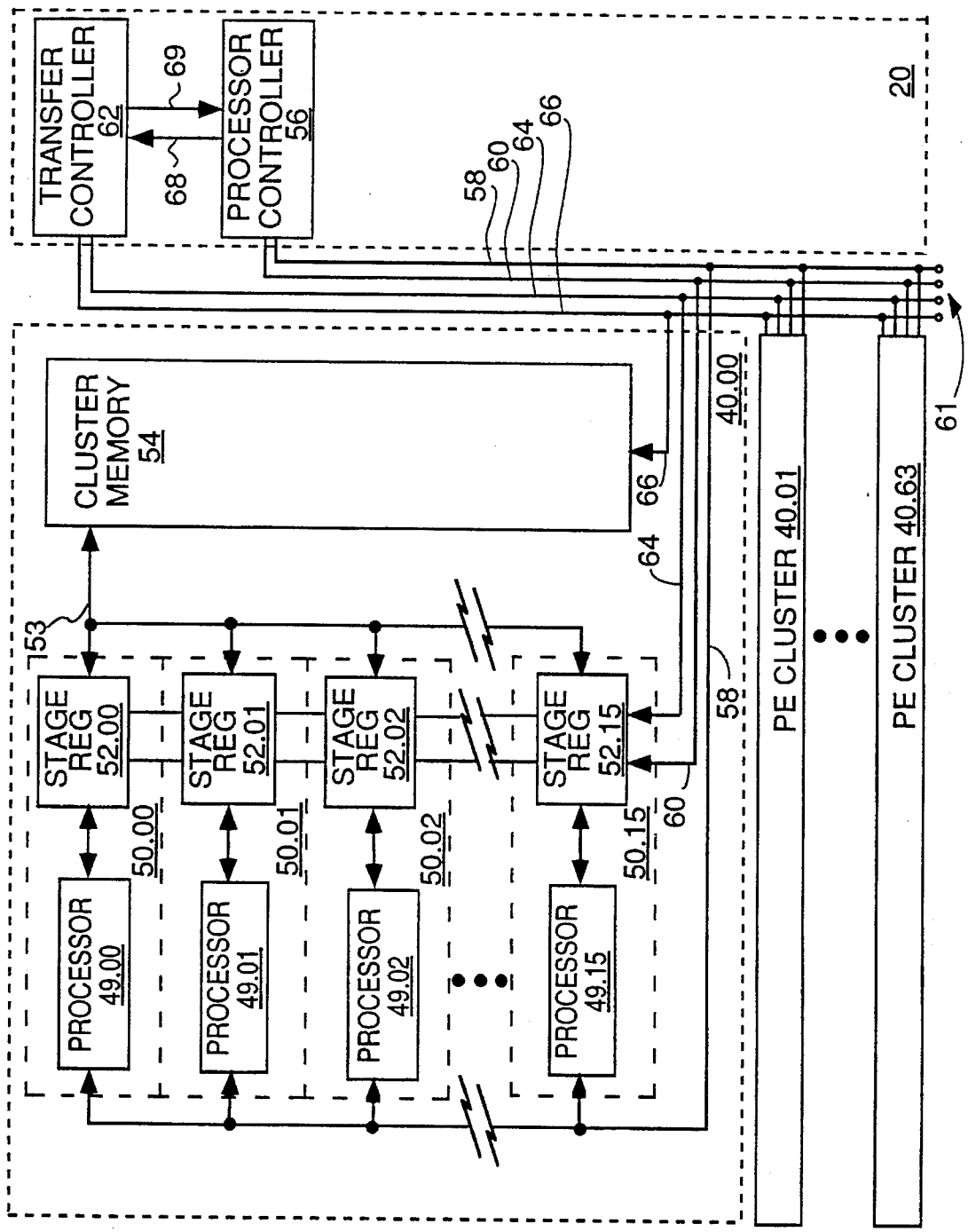
FIG. 2 is a diagrammatic view of a processor element printed circuit board in accordance with the present invention.

A processor element printed circuit board ("PE board") illustrative of boards 10a and 10b is shown in FIG. 2. A PE board includes 64 substantially identical PE clusters 40.00–40.63 arranged two clusters per chip for a total of 32 PE cluster chips per PE board. Each of clusters 40.00–40.63 includes a cluster memory 54 comprising, in one embodiment, 256 K-bytes of memory, so that each PE board carries 16 megabytes of memory. Hence, a parallel processor configured with 16 PE boards would have 256 megabytes of memory if readily available 1 megabit memory chips are used, and 1 gigabyte of memory if 4 megabit memory chips are used.

Memory System Overview

Conceptually, cluster 40.00 comprises 16 substantially identical processor elements 50.00–50.15, which include respective processors 49.00–49.15 connected to respective stage registers 52.00 through 52.15 by respective bidirectional local data buses. Stage registers 52.00–2.15 are connected to cluster memory 54 by common data bus 53. The processor elements 50.00–50.15l are clocked at 70 nanoseconds.

Conceptually, the ACU 20 includes a parallel processor controller 56 and an independent transfer controller 62. In fact, both controllers 56 and 62 are implemented as standard RAM or ROM -based microcoded sequential state machines. The ACU 20 communicates with all of the PE boards and with all of the clusters on each PE board, e.g. clusters 40.00–40.63, over inter alia four control lines 58, 60, 64 and 66, each of which is implemented as several physical lines. Processors 49.00–49.15 are controlled over line 58 by either processor controller 56 or transfer controller 62, depending on which controller owns line 58 as determined by an arbitration mechanism (not shown). Stage registers 52.00–52.15 are controlled over line 60 by either processor controller 56 or transfer controller 62, depending on which controller owns line 60 as determined by an arbitration mechanism (not shown). In addition, transfer controller 62 controls stage registers 52.00–52.15 over line 64. Cluster memory 54 is controlled over line 66 by transfer controller 62. Parallel processor controller 56 and independent transfer controller 62 are connected to one another by handshaking lines 68 and 69, each of which is implemented as several physical lines.

Figure 3:
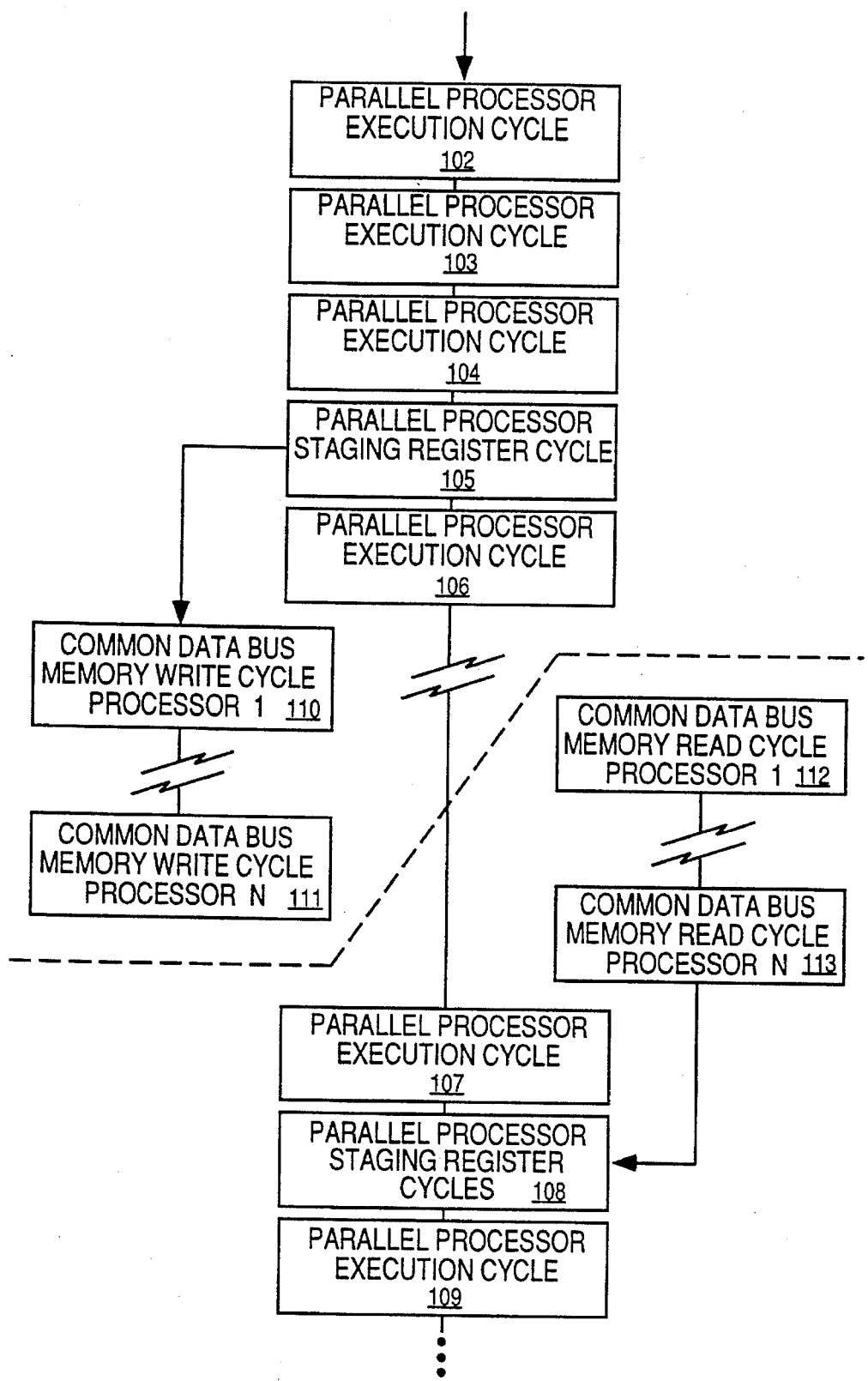
FIG. 3 is a flowchart of execution and data bus cycles of the parallel processor of FIG. 1.

An overview of the operation of the parallel processor memory system is now discussed with reference to the brief execution sequence shown in FIG. 3. Steps 102–104, 106–107, and 109 are conventional parallel processor execution cycles, executed by processor elements 50.00–50.15 under the control of parallel processor controller 56. Steps 105 and 108 are staging register cycles, during which respective sequential memory write operations 110–111 and sequential memory read 112–113 are initiated between the staging registers 52.00–52.15 and cluster memory 54. Once initiated, sequential operations 110–113 proceed independently of parallel processor execution steps such as 106–107, except for handshaking over lines 68 and 69.

Consider a memory input (write) operation. Processor controller 56 instructs processors 49.00–49.15 over line 58 to set up the data in a suitable manner, and provided line 69 is not signaling "busy" instructs the transfer controller 62 over line 68 to initiate the memory write. As represented by step 105, the transfer controller 62 signals "busy" on line 69, interrupts the processor controller on line 69, transfers data from the processors 49.00–49.15 to the stage registers 52.00–52.15 in two cycles (transferring one nibble per cycle, as is evident from the description of the processor element data path below), and then releases the interrupt of processor controller 56. Processor controller 56 then instructs processors 49.00–49.15 to continue parallel processing operations (represented by steps 106), and these operations proceed provided they are not incompatible with the "busy" state of line 69. Transfer controller 62 instructs the stage registers 52.00–52.15 over line 64 to transfer data, and memory 54 over line 66 to receive data, one stage register at a time (represented by steps 110–111). When all data from participating ones of the stage registers 52.00–52.15 is transferred, the transfer controller 62 signals all clear on line 69.

Consider a memory output (read) operation. Processor controller 56 instructs the transfer controller 62 over line to initiate the memory read. As represented by steps 112–113, the transfer controller 62 signals "busy" on line 69, instructs the memory 54 over line 66 to output data, and instructs stage registers 52.00–52.15 over line 64 to receive data, one stage register at a time. Processor controller 56 instructs processors 49.00–49.15 to continue parallel processing operations (represented by step 107), and these operations proceed provided they are not incompatible with the "busy"0 signal on line 69. When data from memory 54 is loaded into participating ones of the stage registers 52.00–52.15, the transfer controller 62 interrupts the processor controller 56 on line 69, transfers data from the stage registers 52.00–52.15 to the processors 49.00–49.15 in two cycles (transferring one nibble per cycle, as is evident from the description of the processor element data path below), and releases the interrupt of processor controller 56. Then, the transfer controller 62 signals all clear on line 69.

Processor Element Data Path

The processor element data path now is described with reference to FIG. 4, which illustrates the PE data path in a representative processor element 200; FIG. 5, which shows in greater detail the arithmetic processing unit ("APU") 201 of FIG. 4; and FIG. 6, which illustrates the cluster-level elements with which processor element 200 is associated.

The architecture of the processor element 200 accommodates two classes of instructions. The first class includes regular arithmetic instructions that operate only on registers internal to APU 201 (FIG. 5), such as an accumulator 204, an exponent register 206, and a PE register set 220. The architecture that supports such instructions is described below, with reference to FIG. 5. The second class of instructions includes load and store instructions that move data between the APU 201 and cluster memory 260. The architecture that supports such instructions is described under the subheadings "Cluster Memory Data Transfer" and "Cluster Memory Addressing" below, with reference to FIGS. 4 and 6.

The arithmetic processing unit ("APU") 201 is at the heart of each processor element. As shown in FIG. 5, the APU 201 includes several conventional elements such as arithmetic logic unit ("ALU") 202, Boolean logic unit ("BLU") 320, and associated registers and flags.

The ALU 202 is organized around a 4-bit wide internal data bus 208, which furnishes data to ALU 202 over 4-bit line 210. The data bus 208 is hereinafter referred to as nibble bus 208, inasmuch as it accommodates the transfer of only half a byte (a "nibble") during any one clock cycle. Alternatively, a full byte-wide bus or other fraction or multiple thereof may be used. Other inputs to the ALU 202 include the four least significant bits ("low nibble") of a 64-bit accumulator 204 over a 4-bit line 211, and a nibble from PE registers 220 over 4-bit line 234.

The four bit output of ALU 202 is directed over 4-bit line 218 to the low nibble of accumulator 204, to the four most significant bits ("high nibble") of the accumulator 204, and to the four most significant bits of an exponent/address register 206. Line 212 provides a 4-bit connection between the nibble bus 208 and the 4 least significant bits of accumulator 204; line 214 provides a 4-bit connection from the 4 most significant bits of accumulator 204 to the nibble bus 208; and line 216 provides a 4-bit connection from the 4 least significant bits of the exponent/address register 206 to the nibble bus 208.

The one bit outputs of ALU 202 are directed to a carry ("C") bit 330 over line 354, to a zero ("Z") bit 332 over line 352, and to an overflow ("V") bit 334 over line 350. A negative ("N") bit is taken from the most significant bit of the accumulator 204. The output of the C bit 330 is directed to an input of the ALU 202 over line 356.

The BLU 320 is organized around a one bit wide internal bus 300 known as a bit bus, which provides one input to BLU 320 over line 322. A flag bus 324 provides another input to BLU 320. Several one bit registers that typically represent the status of the ALU 202 provide outputs to the flag bus 324: Z-bit 332, V-bit 334, E-bit 336, and M-bit 338. A third input to the BLU 320 is provided over line 326 by a L-bit register 340, which is the 1-bit equivalent of an accumulator. The one bit output of BLU 320 is directed over line 328 to the Z bit 332, the V bit 334, the E bit 336, the M bit 338, and the L bit 340.

Local memory for the ALU 202 is provided by a set of working registers known as PE registers 220. PE registers 220 comprises sixty-four 32-bit registers arranged as 512×4 or 2048×1 memory, which are obtained from, for example, conventional SRAM memory as described below in association with FIG. 14. Controller 228 is connected to PE registers 220 over 4-bit line 230. Data is exchanged with nibble bus 208 over 4-bit line 234 (and provided to ALU 202 via line 210), and exchanged with bit bus 300 over line 233. PE registers 220 are loaded or unloaded under ACU 20 control, in accordance with address information furnished over broadcast bus 250 over 11-bit line 224.

An additional 4-bit path 232 is provided from controller 228 to an input of the ALU 202. Path 232 provides the ALU 202 with an input operand and permits the reading and writing of the same word in PE register set 220 in one clock. Data from the nibble bus 208 is written into PE register set 220 via path 234 simultaneously as data from the PE register set 220 is read into ALU 202 via path 232. This operation advantageously permits data in, for example, the accumulator 204 (either the most significant or least significant nibble) to be swapped with data in the PE register set 220 in one clock.

Using the examples of a simple addition and comparison, arithmetic and logical operations carried out in APU 201 are now described.

For an arithmetic operation, assume that operand "A" is resident in accumulator 204 and operand "B" is resident in one of the PE registers 220. At the initial clock pulse in the sequence, the low nibble from accumulator 204 is applied to the ALU 202 via the nibble path 211, and the low nibble from the appropriate one of the PE registers 220 (as addressed on line 224) is applied to the ALU 202 on line 10, via line 234 and the nibble bus 208. The accumulator 04 is shifted four bits to the right. The 4-bit addition is performed by the ALU 202, and the four bit sum is read into the high nibble of the accumulator 204 while the one bit flags are updated. These operations are repeated eight times for a 32-bit word.

For a logic operation such as a processor element enable/disable decision, assume that one number has been subtracted from another and the result now appears in accumulator 204, C-bit 330, Z-bit 332, and V-bit 334. The enable/disable decision might be based on, for example, whether one number is equal to, lower than or higher than the other number, and such a decision involves logical computations based on the state of the N-bit (from accumulator 204), C-bit 330, Z-bit 332, and V-bit 334. The results of the computations are stored in one of the one bit registers. Frequently, such calculations are made in order to determine whether a given processor element will or will not execute a subsequently broadcasted instruction, in which case the results of the computations are stored in the E-bit 336.

Other Data Path Elements

Figure 4:
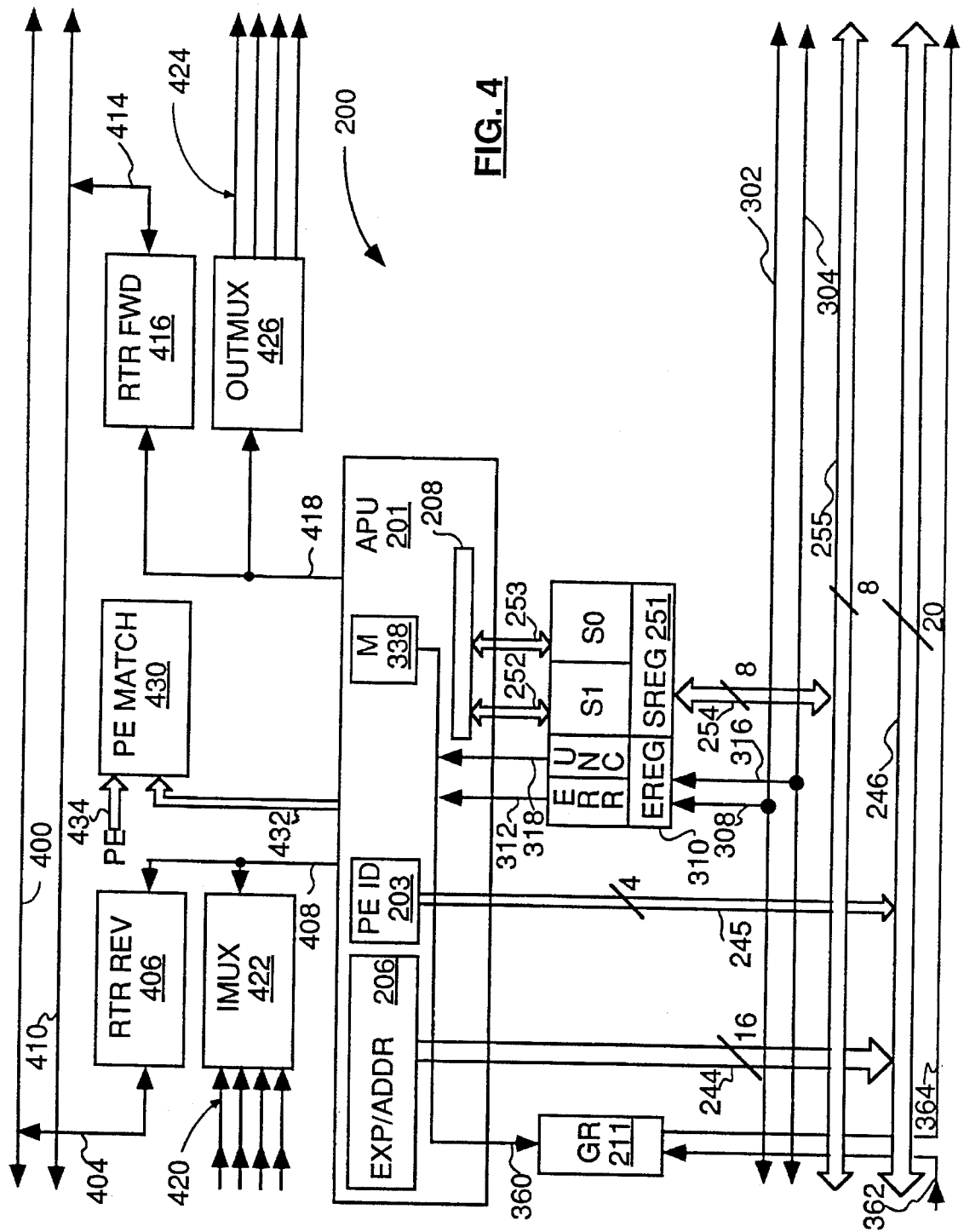
FIG. 4 is a block diagram of the data flow path for an exemplary processor element in accordance with the present invention.
Figure 5:
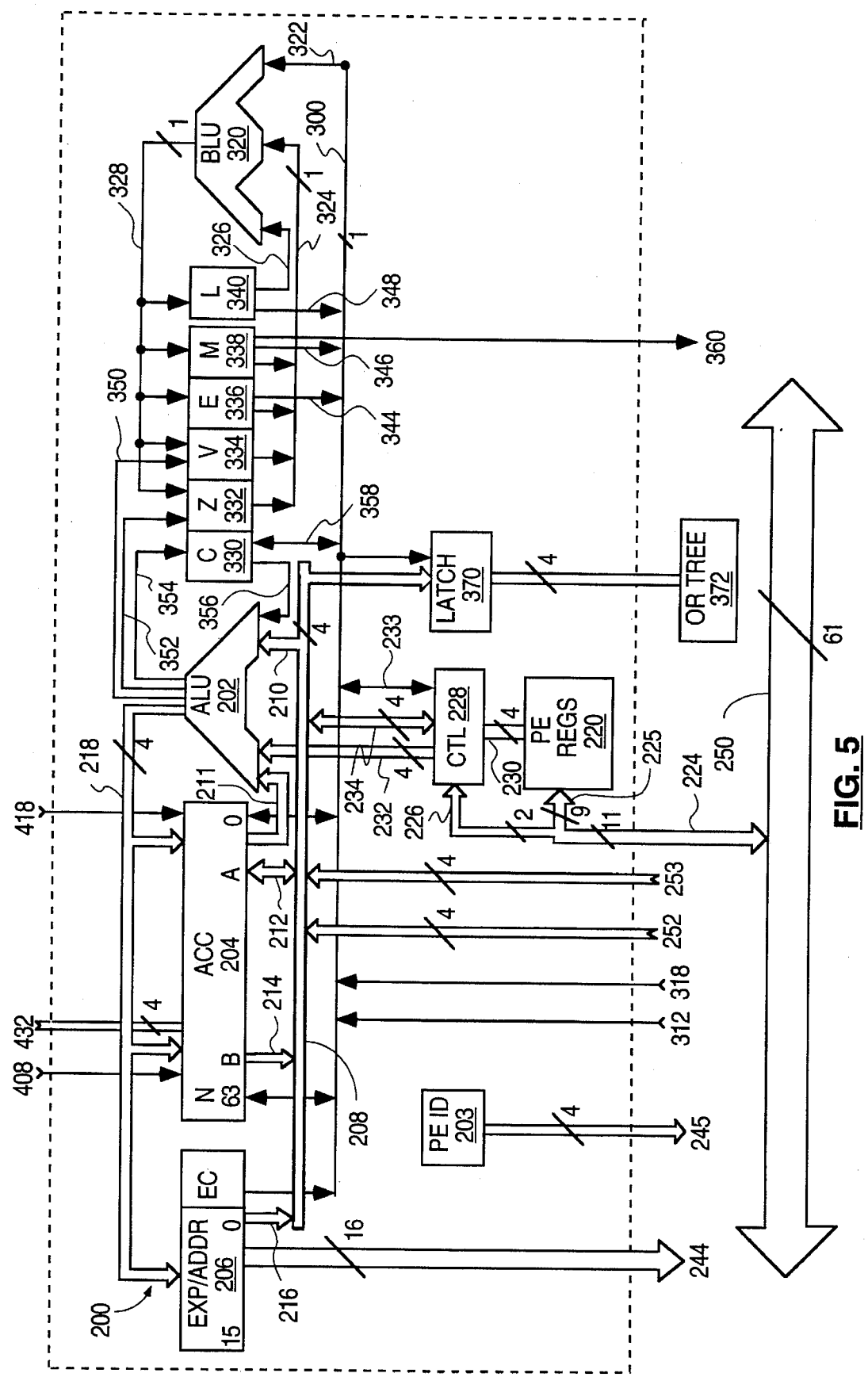
FIG. 5 is a block diagram of the data flow path for the exemplary arithmetic processing unit of FIG. 4.
Figure 6:
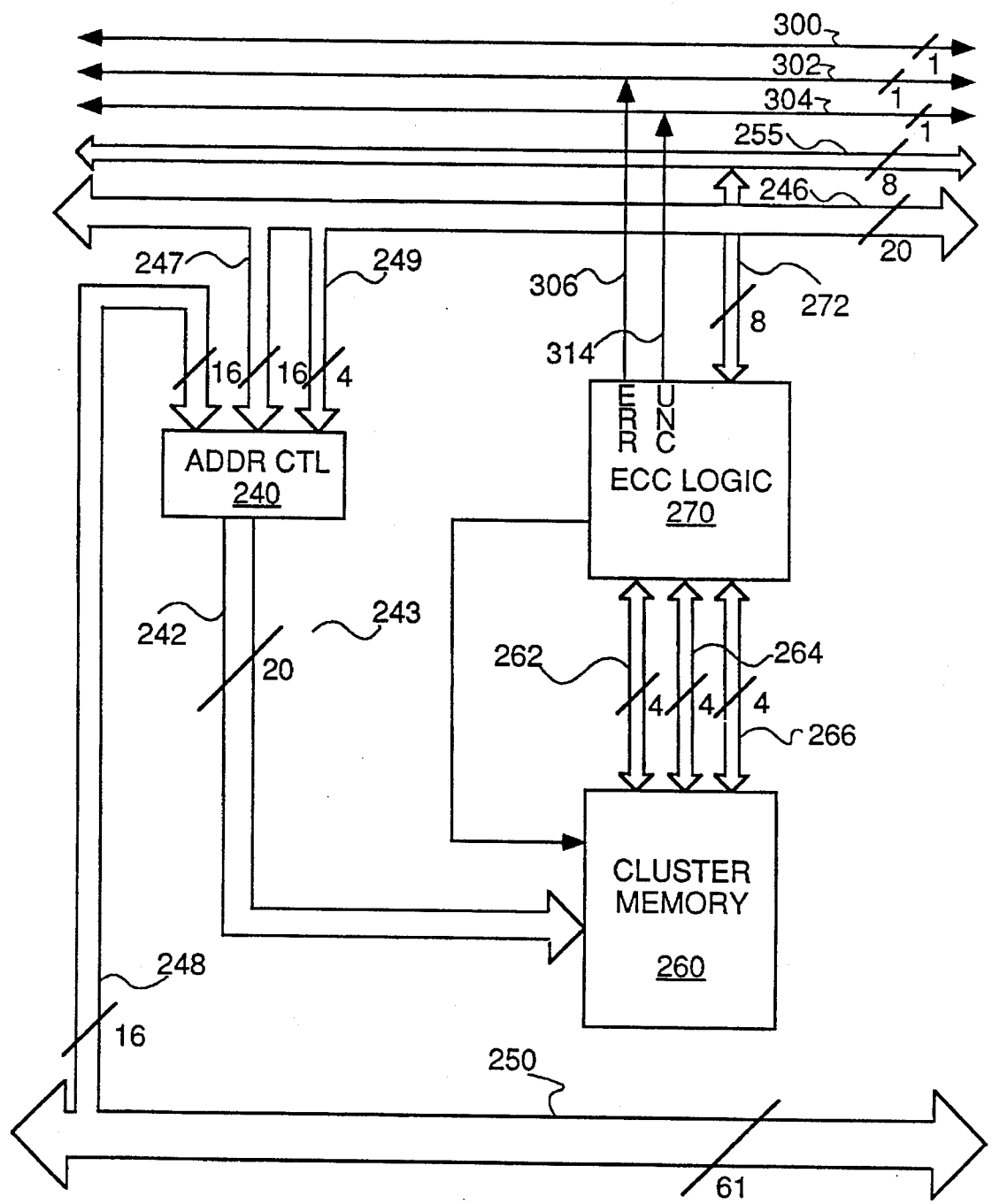
FIG. 6 is a block diagram of the data flow path common to all processor elements of a cluster in accordance with the present invention.

Router connections of the processor element 200 are illustrated in FIGS. 4 and 5. The processor element 200 is connected to a suitable router system over global router lines 400 (router-in) and 410 (router-out) in an arrangement comprising a router reverse circuit 406 (connected to accumulator 204 over line 408), router forward circuit 416 (connected to accumulator 204 over line 418), and PE match circuit 430 (connected to accumulator 204 over 4-bit bus 432). The design and operation of a suitable router system is described in the aforementioned Application of Zapisek.

The processor element 200 is connected to a suitable local interconnect system such as, for example, that described in U.S. Pat. No. 4,314,349, issued Feb. 2, 1982. Four network input lines 420 and four network output lines 424 are used. Input lines 420 are multiplexed to the accumulator 204 through input multiplexer 422 over line 408, and the accumulator 204 is multiplexed to the output lines 424 through output multiplexer 426 over line 418.

The nibble bus 208 has a 4-bit connection to latch 370, for the purpose of latching certain values into an OR tree 372. An OR tree is a general computing function which provides for a global OR inclusive of every processor element of the parallel processor. The OR tree 372 functions as a global OR of the 4-bit nibble of all processor elements in the parallel processor. As is well known in the art, the OR tree operation is used for many purposes, including error and overflow checking.

Processor Element-Cluster Memory Data Path

Figure 16:
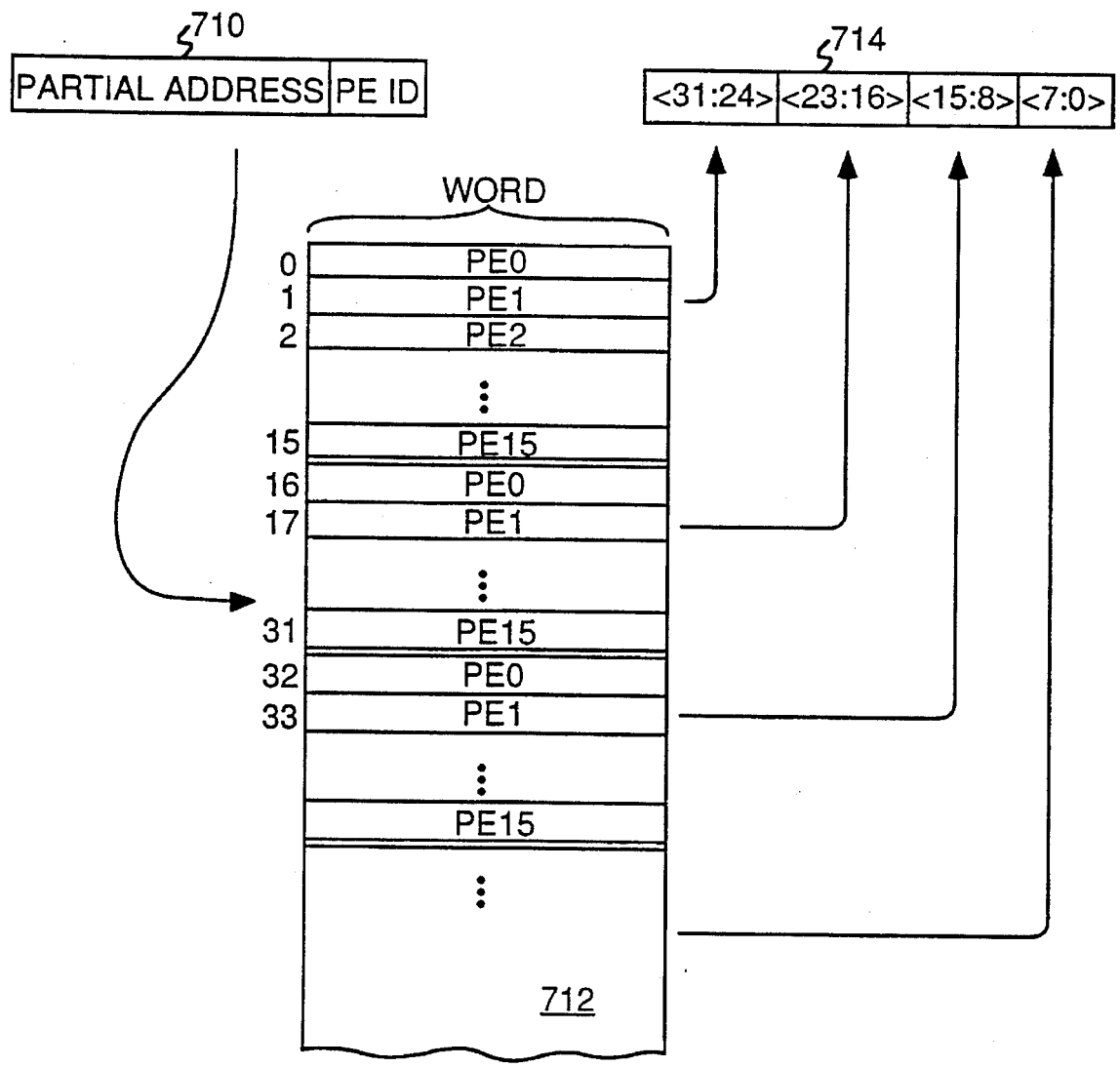
FIG. 16 is a diagram illustrating an organization for the cluster memory of FIG. 6.

Each cluster memory 260 includes 256 K-words of memory. Each word is 12 bits wide, and includes 8 data bits and 4 check bits. Each word is uniquely associated with one of the processor elements 50.00–50.15; for example, words 0 and 16 are associated with processor 50.00, words 1 and 17 are associated with processor 50.01, and so forth. This memory organization is illustrated in FIG. 16. Element 712 shows the organization of cluster memory 260. Element 710 represents a full address in cluster memory 260, which consists of a 4-bit processor element identification number PE_ID and a partial address indicating the address within the identified processor element's memory space. Element 714 shows a full 32-bit word resulting from a read of the cluster memory 260 for a given address and a given processor element. For example, to obtain a full 32-bit word associated with processor element identification number PE1 from address 1 of the cluster memory 260, words 1, 17, 3 and 49 in the memory organization 712 are obtained in respective nibbles to form 32-bit word 714 for the processor element PE1. The implications of this memory organization are discussed elsewhere.

A variety of memory types are suitable for memory 260. One suitable type is DRAM having, for example, a random mode access time of about 100 nanoseconds and a page mode access time under about 70 nanoseconds. Physically, memory 260 includes three 4×256 K-bit page-mode DRAM chips, which accommodates the 8 data bits and 4 check bits. The data and check bits are processed by an ECC logic circuit 270 (FIG. 6) associated with the cluster, and exchanged with the requesting processor element as an 8 bit data byte with 2 status bits (an error detected bit and an uncorrectable error bit, as described below). Other implementations are possible, such as, for example, a 5 check bit implementation.

Data is transferred between cluster memory 260 and APU 201 through a processor element stage register 251 and cluster ECC logic 270, which performs an error correction function. Lines 252 and 253 provide two 4-bit connections between the nibble bus 208 of the APU 201 and, respectively, the 4 high order bits and the 4 low order bits of the stage register 251. Line 254 provides an 8-bit connection between the stage register 251 and the cluster data bus 255, which along with ECC logic 270 and memory 260 are associated with the cluster. Line 272 provides an 8-bit connection between the cluster data bus 255 and the ECC logic 270. The connections between ECC logic 270 and cluster memory 260 include 4-bit line 262 and 264, for respectively the 4 high order and the 4 low order data bits, and a 4-bit (5-bit and other alternatives are possible) line 266 for the check bits, which are used in generating an ERR-signal and a UNC-signal status bits for recording the status of memory read operations.

Status signals ERR and UNC are provided over two one bit cluster-oriented buses, ERR bus 302 and UNC bus 304. The ERR signal, which indicates whether an error has occurred, is communicated as follows. Line 306 provides a one bit connection from ECC logic 270 to ERR bus 302, line 308 provides a one bit connection from ERR bus 302 to error status register 310, and line 312 provides a one bit connection from ECC register 310 to bit bus 300 of APU 201. The UNC signal, which indicates whether an error is uncorrectable, is communicated as follows. Line 314 provides a one bit connection from ECC logic 270 to UNC bus 304, line 316 provides a one bit connection from UNC bus 304 to ECC register 310, and line 318 provides a one bit connection from ECC register 310 to bit bus 300 of APU 201.

The status of M bit 338 of APU 201 determines whether the associated processor element 200 executes a memory load/store instruction. As described above, Boolean computations are performed by BLU 320 to determine whether the processor element 200 will or will not execute a subsequently broadcasted instruction, and the results of the computations are stored in the E-bit 336. Similarly, Boolean computations performed by BLU 320 also determine whether processor element 200 will or will not execute subsequent memory load/store operations, and the results of the computations are stored in the M-bit 338. Typically, M-bit 338 is set and reset by BLU 320 in accordance with an IF . . . THEN . . . ELSE statement. For example, as each processor element in the parallel processor executes an IF . . . THEN . . . ELSE statement pertaining to, say, a memory load/store on its respective data, an active set of processor elements arises depending on whether the results of the individual executions is true or false. Only the processor elements having their M bits set will execute load/store instructions subsequently broadcast by the ACU 20.

The M bit 338 controls the transfer of data from the cluster memory 260 to the stage register 251 by means of the grant request ("GR") bit 211. Line 360 accommodates the copying of M bit 338 into the GR bit 211 at the initiation of a load/store operation. GR bit 211 is located on a daisy chain; line 362 originates at the GR bit of the processor element preceding processor element 200, and line 364 terminates at the GR bit of the processor element following processor element 200. A daisy chain implementation is particularly advantageous when on-chip routing is considered, although other implementations such as round robin scheduling may be used. In the cluster 40.00 (FIG. 2), for example, during a load/store operation involving several bytes per each of the processor elements 50.00–50.15, the status (set/reset) of the respective M bits of the processor elements 50.00–50.15 are copied into the respective GR bits of the processor elements 50.00–50.15 at the initiation of each byte load/store. Sixteen 16 clock pulses are sequentially generated during each byte load/store, one for each processor element in the cluster. Following system reset, the daisy chain will begin at processor element 50.00. Hence, assuming that the GR bit for processor element 50.00 is set, initially processor element 50.00 requests the use of the cluster data bus 5. Once the byte transfer to the stage register 52.00 of processor element 50.00 is completed, the GR bit of processor element 50.00 is reset. The next processor in the daisy chain to request the cluster data bus 255 is the one having its GR bit set; intervening processor element having their GR bits reset do not participate. Hence, within different clusters, the number of stage registers 251 participating in a data transfer operation may well be different. Moreover, within each cycle, the active grant request bits of the respective clusters may well be associated with different processor element numbers.

In one variation, a condition is detected in which the number of active grant request bits per cluster is everywhere less than sixteen. This may be accomplished by the OR-tree 372 or by a dedicated OR-tree (not shown). When the condition is detected, the cycles are optimized to the number of active grant request bits in the cluster having the maximum number of active grant request bits.

Because the number of stage registers 251 participating in a data transfer operation may be different than the total number of stage registers 251 in the cluster, the width of the data word in cluster memory 260 preferably is selected to match the width of the stage registers 251 in the cluster and the addressing width of the parallel processor. Otherwise, data transfer transactions may be performed for processor elements that are not participating in the data transfer, which would require, for example, a read modify write cycle each time data is written. The unit of addressing selected for the cluster memory 260 is an 8-bit data word, which represents a compromise between the size of the staging register 251, the number of cycles required to transfer words, and the number of error and check bits required for error correction. The present configuration advantageously minimizes register size, but increases both the number of memory cycles to transfer words and the amount of error correction bits per word (e.g., for single-bit error correction, a 32-bit word requires only 6 check bits, while 4 8-bit words requires 4×4 or 16 check bits). Of course, other configurations may be developed in accordance with this disclosure to minimize memory cycles or the number of check bits, or to achieve a different balance of these characteristics.

The parallel processor also supports load/store solitary operations, for which the daisy chain implementation of the grant request mechanism is particularly advantageous. A load/store solitary instruction never requires more than one processor element in the cluster to initiate a load/store operation; for example, a code sequence directed to communications with the router network (routers 14, 16 and 18 of FIG. 1) where data from the router originates in memory. Consider, for example, storing data just received over the router network (14, 16, 18). Each cluster will have the data resident in its active processor element, and it would be desirable to store the data from all of the active processor elements at the same time. Since only one GR bit per cluster would have been set in the load solitary operation, a store operation will store the data from all of the clusters at the same time. Contrast the daisy chain implementation with, for example, the round robin scheduling implementation, which would require potentially 16 processor elements per cluster to be inspected prior to effecting the simultaneous transfer.

The ERR signal and the UNC signal are used at the end of a load instruction to perform error analysis. Either the ERR bit or the UNC bit of processor element error status register 310 can be clocked onto bit bus 300 in a clock cycle, where it is available to the BLU 320 and the OR tree 72. An example of the use of the ERR-bit is as follows. The ERR bit of each processor element is placed onto the bit bus 300 and latched into latch 370. The latched nibble, which includes the ERR bit, is ORed with the nibbles of all other processor elements of the parallel processor and the result is furnished to the ACU 20. In the event that the error is detected, the UNC bit of each processor element is placed onto the bit bus 300 and latched into latch 370. The latched nibble, which includes the UNC bit, is ORed with the nibbles of all other processor elements of the parallel processor and the result is furnished to the ACU 20. If an uncorrectable error is indicated, a system fault is signaled. Otherwise, the error is logged. Should the error count exceed a selected threshold, a system fault is signaled. Such operations and the programs that control them are well known in the art.

Cluster Memory Addressing

The addressing of cluster memory 260, which is shared by all processor elements belonging to the same cluster, is effected by an address controller 240 (FIG. 6) over a 20 bit wide path 242, which is implemented as a multiplexed 10 bit line. Line 243 (from ECC logic 270) provides control signals to the DRAMs of cluster memory 260 affecting such functions as row address strobe, column address strobe, write enable, and chip enable. Line 243 typically is implemented in several physical wires, depending on the memory devices used.

Address information reaches address controller 240 either from a processor element or from the ACU 20. An address provided by a processor element resides in an address register. In the processor element 200, the register 206 serves both as a conventional exponent register as well as an address register, in order to reduce the die size of the processor element 200. Alternatively, a separate 16-bit physical register may be used as a dedicated address register. Line 244 provides a 16-bit connection from the exponent/address register 206 to a 20-bit cluster address bus 246. The other 4 bits of cluster address bus 246 are provided by line 245, which carries a partial address signal generated by hardware element 203 to identify uniquely the processor element 200 in the cluster. Alternatively, element 203 can be a register that is set locally by loading from the nibble bus 208 or line 218. In this event, line 245 can be driven to achieve access to memory owned by another processor element in the same cluster. This provides for rapid communication between processor elements in the same cluster. Line 247 provides a 16-bit connection from cluster address bus 246 to the 16 most significant bits of address controller 240, and the four additional processor element identification bits are provided over line 249 to the 4 least significant bits of the address controller 240.

An address originating in the ACU 20 is broadcast as a 16-bit partial address to all processor elements in the parallel processor over a broadcast bus 250. Broadcast bus 250 is implemented as a 61-bit bus, some of the lines of which are multiplexed to serve several purposes. Bus 250 is used by the ACU 20 for several purposes, including the broadcasting of a partial address during direct address mode operations and the broadcasting of instruction signals to all processor elements in the parallel processor. Line 248 provides a 16-bit connection from a broadcast bus 250 to the 16 most significant bits of address controller 240. To complete the address, four additional processor element identification bits are provided over line 249 to the four least significant bits of the address controller 240.

Cluster memory 260 is addressed either directly or indirectly. In direct addressing, a processor element addresses its own memory space by appending its processor identification number within the cluster, a 4-bit quantity, to a partial address furnished to all processor elements by the ACU 20. In indirect addressing (also known as local addressing), a processor element appends its PE identification number to a partial address computed locally by it. In a variation of indirect addressing, a given processor element locally computes a processor element identification number of another processor element in the cluster, and appends that identification number to the locally computed partial address.

Direct addressing is performed as follows. The ACU 20 broadcasts a 16-bit partial address over broadcast bus 250. The ACU 20 obtains the 16-bit partial address either from data or from performing a calculation. The processor element 200 contributes a 4-bit partial address consisting of its own unique number, known as a PE number, to specify its physical address space in cluster memory 260. For example, in the cluster 40.00, the processor elements 50.00–50.15 contribute their respective PE numbers to completely specify their respective address spaces in cluster memory 260.

From address controller 240, physically the 20 bits of address information are furnished in row/column multiplexed form; hence, only ten physical wires are used. During direct addressing, memory efficiency in the fast page mode (or static column mode) DRAM cluster memory 260 is improved by "interleaving" the cluster memory 260 among processor elements 50.00–50.15, such that when processor elements 50.00–50.15 each address the same logical address in direct address mode, they in fact access a block of 16 contiguous words in physical memory. For example, processor element 50.00 has access to words 0, 16, 32, 48, and so forth; processor element 50.01 has access to words 1, 17, 33, 49, and so forth; and processor 50.15 has access to words 15, 31, 47, 63, and so forth; so that when processor elements 50.00–50.15 each address a logical address of 0, for example, words 0–15 in the cluster memory 260 are addressed physically. Very nearly the maximum page mode bandwidth of the DRAM memory is thereby achieved.

Internal to the DRAMs, the memory column address changes more frequently that the row address. This is because the row address is entirely contained in the partial address broadcast by the ACU 20 on broadcast bus 250, while the column address includes a partial address identifying one of the 16 processor elements (e.g. 50.00–50.15) in the cluster (e.g. 40.00). In most cases, then, the row address is latched internally in the DRAM and only the column address is changed. In a typical 1 megabit page mode DRAM chip, 512 locations are available per latched row address.

Consider in detail an illustrative direct load operation; the steps for a direct store are similar. A direct load operation has two nested loops, an inner loop which services each processor element in each cluster in fast page mode (e.g., processor elements 50.00–50.15 of cluster 40.00), and an outer loop which sequences through each memory word making up the operand to be transferred. The inner loop transfers data and error status signals between the cluster memory (e.g., memory 260) and the stage registers of successive processor elements (e.g., stage registers 52.00–52.15). The outer loop transfers data in parallel between each of the stage registers and its working register set (e.g., stage register 251 and PE registers 220 of processor element 200). This transfer interrupts execution each time through the outer loop and borrows the processors (e.g., processors 49.00–49.15) to do the transfer. Overhead is low because all of the processor elements of the parallel processor do the transfer concurrently. During the stage register transfer, memory read operations also compute the logical OR of the error status from all processor elements via the bit bus 300 for use by the memory control system. The steps for a direct load are given in Table 1 below.

TABLE 1

| Step | PE# | Word | Operation |
|---|---|---|---|
| 1 | — | 0 | set row address (if needed) |
| 2 | 0 | 0 | set col address, ram -> stage transfer |
| 3 | 1 | 0 | next col address, ram -> stage transfer |
| 4 | 2 | 0 | next col address, ram-> stage transfer |
| ○ | ○ | ○ | |
| ○ | ○ | ○ | |
| ○ | ○ | ○ | |
| 17 | 15 | 0 | next col address, ram -> stage transfer |
| 18 | all | 0 | stage -> PE register transfer, ERR -> bit bus transfer |
| — | — | 1 | set row address (if needed) |
| 19 | 0 | 1 | set col address, ram -> stage transfer |
| 20 | 1 | 1 | next col address, ram-> stage transfer |
| 21 | 2 | 1 | next col address, ram -> stage transfer |
| ○ | ○ | ○ | |

TABLE 1-continued

| Step | PE# | Word | Operation |
|---|---|---|---|
| ○ | ○ | ○ | |
| ○ | ○ | ○ | |
| 34 | 15 | 1 | next col address, ram -> stage transfer |
| 35 | all | 1 | stage -> PE register transfer, ERR -> bit bus transfer |

It will be appreciated that the total time for a typical direct load/store is tRAS+((nPEs)(tCAS)+tSR)(OPLEN) where tRAS and tCAS are the times to set a row and column address, nPEs is the number of processor elements in a cluster, tSR is the time to transfer the stage register to the PE register file, and OPLEN is the number of memory words in the operand to be loaded or stored. DRAM row change cycles may reduce this performance somewhat.

Indirect, or local addressing, is performed as follows. Each processor element of a cluster calculates an address and places that address in its respective exponent/address register. With respect to representative processor element 200, for example, ALU 202 calculates an address and loads it over line 218 into the exponent/address register 206. This address residing in exponent/address register 206 then is furnished to address controller 240 via line 244 and cluster address bus 246, as required.

It will be appreciated that while the use of the exponent/ address register 206 for indirect addressing during an indirect load/store operation precludes some floating point operations, die area is minimized. In fact, many of the data path and control aspects of an exponent register are well suited for indirect addressing purposes. An exponent requires a fairly wide register, as does a memory address. In the present memory architecture, both exponents and addresses are built by shifting, hence require a shift register mechanism. Moreover, both exponent and address must be incremented from time to time, the exponent when normalizing or denormalizing, the address when stepping through sequential addresses. Alternatively, full flexibility can be obtained by the use of separate individual registers for floating point operations and indirect addressing operations, although die area would be increased due to the additional register. Consider in detail an illustrative indirect load operation; the steps for an indirect store are similar. A fast indirect load operation works much the same way as the direct load, but since contiguous processor elements can access noncontiguous memory addresses, fast page mode cannot be used and a new DRAM row address is generated for each memory word transferred. Nevertheless, indirect load operations transfer data at nearly the peak DRAM memory random access mode bandwidth, and steal only two PE cycles (the ratio between nibble width and word width) per cluster of words moved. The steps for an indirect load are given in Table 2 below:

TABLE 2

| Step | PE# | Word | Operation |
|---|---|---|---|
| 1 | 0 | 0 | set row address |
| 2 | 0 | 0 | set col address, ram - > stage transfer |
| 3 | 1 | 0 | set row address |
| 4 | 1 | 0 | set col address, ram -> stage transfer |
| 5 | 2 | 0 | set row address |
| 6 | 2 | 0 | set col address, ram -> stage transfer |
| ○ | ○ | ○ | |
| ○ | ○ | ○ | |
| ○ | ○ | ○ | |

TABLE 2-continued

| Step | PE# | Word | Operation |
|------|-----|------|-----------|
| 32 | 15 | 0 | set row address |
| 33 | 15 | 0 | set col address, ram -> stage transfer |
| 34 | all | 0 | stage -> PE register transfer, ERR -> bit bus transfer; increment exponent/address register 206 |
| 35 | 0 | 1 | set row address |
| 36 | 0 | 1 | set col address, ram -> stage transfer |
| 37 | 0 | 1 | set row address |
| 38 | 1 | 1 | set col address, ram -> stage transfer |
| 39 | 2 | 1 | set row address |
| 40 | 2 | 1 | set col address, ram -> stage transfer |
| o | o | o | |
| o | o | o | |
| o | o | o | |
| 66 | 15 | 1 | set row address |
| 67 | 15 | 1 | set col address, ram -> stage transfer |
| 68 | all | 1 | stage -> PE register transfer, ERR -> bit bus transfer; increment exponent/address register 206 |

It will be appreciated that the total time for an indirect load/store is ((nPEs)(tRAS+tCAS)+tSR)(OPLEN) where tRAS and tCAS are the times to set a row and column address, nPEs is the number of processor elements in a cluster, tSR is the time to transfer the stage register to the PE register file, and OPLEN is the number of memory words in the operand to be loaded or stored. DRAM row change cycles may reduce this performance somewhat.

Memory System Operation

The operation of the memory system now is described for both memory writes and memory reads. Direct and indirect addressing are considered. During program compilation for the parallel processor of the present invention, the loads are placed in the machine code in advance of where they appear in the computer program. Although not strictly necessary, this approach improves efficiency of the parallel processor of our invention. As explained fully below, while many processor cycles are needed to complete a load transfer, parallel operations may proceed concurrently with the load transfer, provided they do not require the data being loaded. Hence, loading the data in advance of the need for the data maximizes processor efficiency.

Load and store instructions are executed concurrently with arithmetic instructions. When a load/store instruction is fetched by the ACU 20, it is queued in the transfer controller 62. The queue accommodates up to 32 load or store instructions. When a load or store instruction is pulled from the queue by transfer controller 62, it then issues controls on lines 58, 60, 64, and 66 to perform the load or store.

The E-bit 336 in each PE 200 activates that processor element for arithmetic computation. The M-bit 338 in each processor element 200 activates that processor element for load and store memory operations. Because the execution of load and store operations may be delayed by queueing action, the active set of processor elements for computation may well be different than the active set of processor elements for a load or store operation. To accommodate different active sets, a queue of M-bits is maintained in each processor element's register set 220. When the ACU fetches an instruction that conceptually changes the processor element M-bit 338, the action is delayed by recording the new value in each processor element's M-bit queue and by queueing an instruction in the transfer controller 62 load/store queue that causes the actual processor element M-bits 338 to be loaded from the appropriate queued M-bits when the queue is unloaded.

Typically whenever the programmer causes the processor element 200 to recompute the E-bit 338, the programmer also copies the E-bit to the conceptual M-bit. The ACU issues microcoded controls so that actually the E-bit gets copied to the M-bit queue in processor element register 220, and subsequently that value gets loaded into the M-bit 338 when any preceding instructions in the queue are finished. The programmer can also directly compute the conceptual M-bit, and this value is also just stored in the M-bit queue as described above.

The M-bit values are computed by BLU 320 and driven via the L-bit 340 and line 348 onto the bit bus 300, then via line 233 to the processor element register set 220. The queue of M-bits is addressed via the broadcast bus 61 and the processor element register's address path 224 by microcoded sequences in transfer controller 62 using methods well known to those skilled in the art. Subsequently, the actual M-bit 338 is loaded from the processor element registers 220 via line 233, bit bus 300, path 322, BLU 320, and path 328.

In subsequent descriptions, the M-bit 338 will be referred to directly, and the action of the M-bit queue occurs implicitly. The queueing of load and store instructions coupled with queueing of changes to the M-bit permits the load and store instructions to be overlapped with PE execution, and permits E-bit computations to change the set of active processor elements without improperly changing the active set of processor elements that must participate in a given load or store instruction.

In order to prevent a load or store from occurring prematurely, the array control unit 20 includes a 256×2 bit array. Each Nth bit pair is a load tag and a store tag corresponding to the Nth byte of all of the PE register arrays (e.g. 220 of processor element 200) in the parallel processor. These implement the status signals communicated over handshaking lines 68 and 69 discussed above with reference to FIG. 2. As each PE register array 220 has 256 bytes, the ACU 20 requires 256 pairs of load/store tag bits for the entire parallel processor.

The load/store tag registers act as an interlock mechanism between the conceptual processor controller 56 and transfer controller 62 of the ACU 20 (FIG. 2). The load tag indicates when SET that the corresponding byte of PE register array 220 is being written into and should not be read at present. The store tag indicates when SET that the corresponding byte of PE register array 220 is being stored and should not be changed at present. Whenever execution of a load or store instruction is initiated, the ACU 20 sets the load or store tags for all affected PE register bytes, as appropriate. Once the load or store is completed, the tags previously set are cleared (reset). An instruction being executed may not operate on a byte of the PE register array 220 that has one of its corresponding load/store tags in the ACU 20 set if the operation is in conflict with the tag. For example, if an ADD instruction requires an operand that is in the process of being loaded into a given byte of the PE register array 220, as indicated by its corresponding load tag in ACU 20, the ADD instruction would not be executed until the corresponding load tag in ACU 20 is cleared.

During a memory write (e.g., a store instruction) with direct addressing, all processor elements of a cluster having their M-bit (e.g., 338 of PE 200) set load data into their stage registers in parallel in one or more cycles, depending on the relative widths of the PE data bus (e.g., bus 208 of processor element 200 is ½ byte wide) and the stage registers (e.g., 251 of PE 200 is 1 byte wide, hence 2 cycles per byte, or 8 cycles per 32-bit word are required). During the parallel transfer, the active processor elements (M-bit set) set respective memory system grant request flags (e.g., GR bit 211 of PE 200). Using a daisy chain grant mechanism (see, e.g., see lines 362 and 364 of PE 200), the cluster transfer controller (e.g., 62 of cluster 40.00) proceeds to sequentially unload, independently of further parallel operations, each active stage register (e.g., 251 of PE 200) in turn onto the cluster memory bus (e.g., 255), generates ECC check bits in ECC logic (e.g., 270), and writes the 8 bit byte and 4 check bits into the cluster memory (e.g., 260). The memory address is formed from the PE number within the cluster (e.g, 203 of PE 200) and from an address broadcast by the array control unit 20 over broadcast bus 250 (see also line 248 of PE 200).

This process preferably is pipelined due to the difficulty of quickly driving off-chip cluster memory. Write pipelining is achieved by the use of clocked latch.es (not shown) in respectively the cluster address bus 246 and the cluster data bus 255, between the cluster and the off chip cluster memory 260. During a memory write, at the first clock the address and data are latched into respectively the address bus latch and the data bus latch, and at the second clock the address and data are latched by the address controller and the ECC logic respectively.

During a memory write with indirect addressing, the bits of an address register of a processor element (e,g., exponent/ address register 206 of PE 200) are taken as a partial cluster memory address, and the bits of line 248 of the broadcast bus 250 are ignored. The other cluster memory address bits are provided by the PE ID element 203, or alternatively by a register (as discussed above). Because the unit of data transferred belongs to exactly one processor element and is one word in the memory, ECC check bits (e.g., bits on line 266) can be generated by the cluster ECC logic (e.g., 270) from the data obtained from the stage register (e.g., 251) without reading the cluster memory (e.g, 260).

During a memory read (e.g., a load instruction) with direct addressing, all active processor elements of a cluster (i.e., those having their M-bits set) set respective memory system grant request flags (e.g., GR bit 211 of PE 200). The cluster transfer controller (e.g., 62 of cluster 40.00) proceeds independently of further parallel operations to read each requested byte from the cluster memory (e.g., 260) into the cluster ECC logic (e.g., 270) along with the 4 check bits (e.g., data over lines 262 and 264, check bits over line 266). Each cluster ECC logic (e.g., 270) uses the ECC check bits to perform error correction, writes the corrected data into the selected stage register (e,g., 251 of PE 200 over cluster data bus 255), and writes an error status into the selected error status stage register (e.g., 310 of PE 200 over cluster ERR bus 302 and cluster UNC bus 304). The memory address is formed from the PE number within the cluster (e.g., 203 of PE 200) and from an address broadcast by the array control unit 20 over broadcast bus 250 (see also line 248 of PE 200).

This process preferably is pipelined due to the difficulty of quickly driving off-chip cluster memory. Read pipelining is achieved by the use of clocked latches (not shown) in respectively the cluster address bus 246 and the cluster data bus 255, between the cluster and the off chip cluster memory 260. Data latched into the stage register 251 at time "t" must be addressed at time t-2. This is because at about time t-2, the address is latched into the address bus latch; at about time t-1, the address is latched into the address controller 240 and the cluster memory 260, and the data is latched into the data bus latch; and at about time t, the data is latched into the stage register 251.

During a memory read with indirect addressing, the bits of an address register in a processor element (e.g., exponent/ address register 206 of PE 200) are taken as a partial cluster memory address, and the bits of line 248 of broadcast bus 250 are ignored. The other cluster memory address bits are provided by the PE ID element 203, or alternatively by a register (as discussed above). When the cluster transfer controller (e.g., 62 of cluster 40.00) is finished loading the stage registers of the active processor elements, the active processor elements transfer data from their respective stage registers (e.g., 251 of PE 200) in parallel to their respective internal data buses (e.g., bus 208 of PE 200) and then, for example, to a working register (e.g., a selected register of PE register array 220). During this parallel transfer cycle, the OR of all the error status registers is formed on the cluster bit bus (e,g., 300) and returned to the transfer controller (e.g., 62 of cluster 40.00).

A memory to memory move instruction operates like a load and store with the same inner and outer control loops, but the data moves from memory to stage register to memory without using any processor element register sets. There are no interruptions to the normal parallel execution of the processor elements.

Control and Data Path Features

Figure 7:
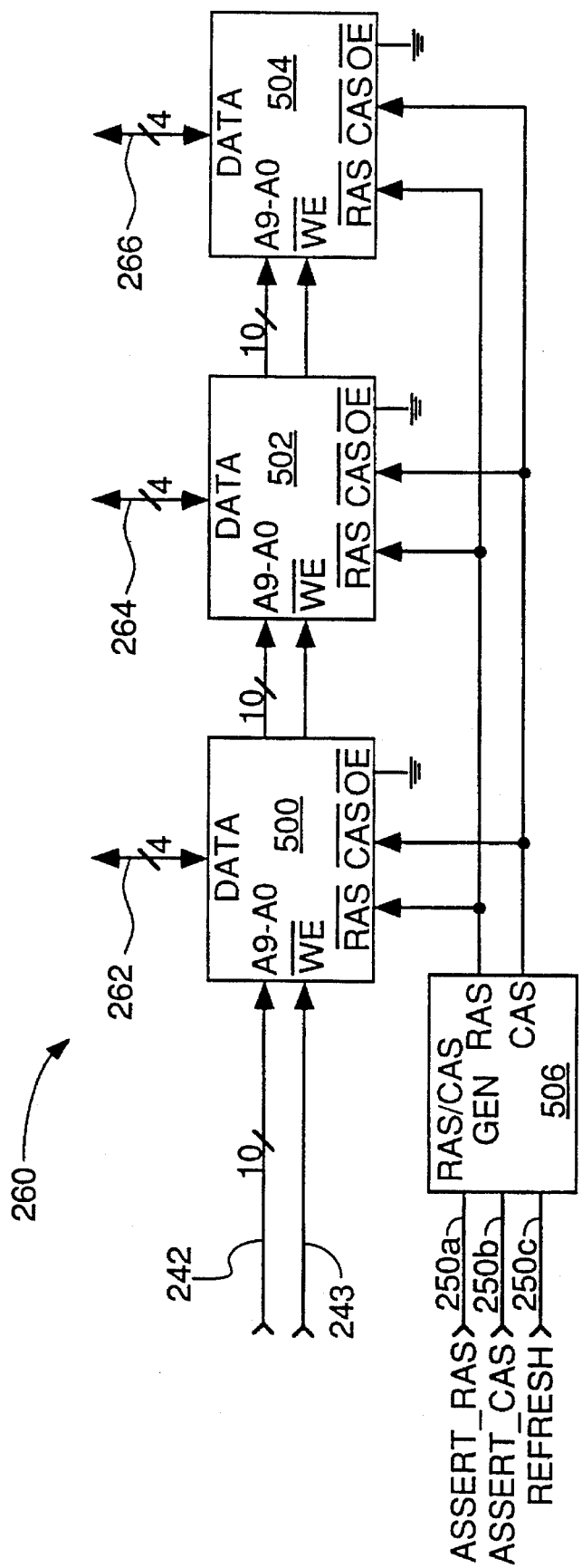
FIG. 7 is a logic schematic diagram of the cluster memory of FIG. 6.

The cluster memory 260, which is illustrated in further detail in FIG. 7, includes three page mode DRAM integrated circuits 500, 502, and 504 of any suitable capacity, such as, for example, 256K×4 bits or 1024K×4 bits. The read or write state of cluster memory 260 is determined by line 243, which is connected to the write enable pin WE bar of each DRAM 500, 502 and 504. Bits A9–A0 of each DRAM 500, 502 and 504 are addressed over line 242, which in this embodiment is implemented as a 10-bit multiplexed line that furnishes either a row or column address. The address type is identified to the DRAMs 500,502 and 504 by separate RAS bar and CAS bar signals from an on-board RAS/CAS generator 506, which are directed to, respectively, the RAS bar and CAS bar inputs of each DRAM 500, 502 and 504. RAS/CAS generator 50,6 is driven by an assert-RAS signal on line 250a, an assertCAS signal on line 250b, and a refresh signal on line 250c. Lines 250a, 250b and 250c are part of the broadcast bus 250.

Figure 8:
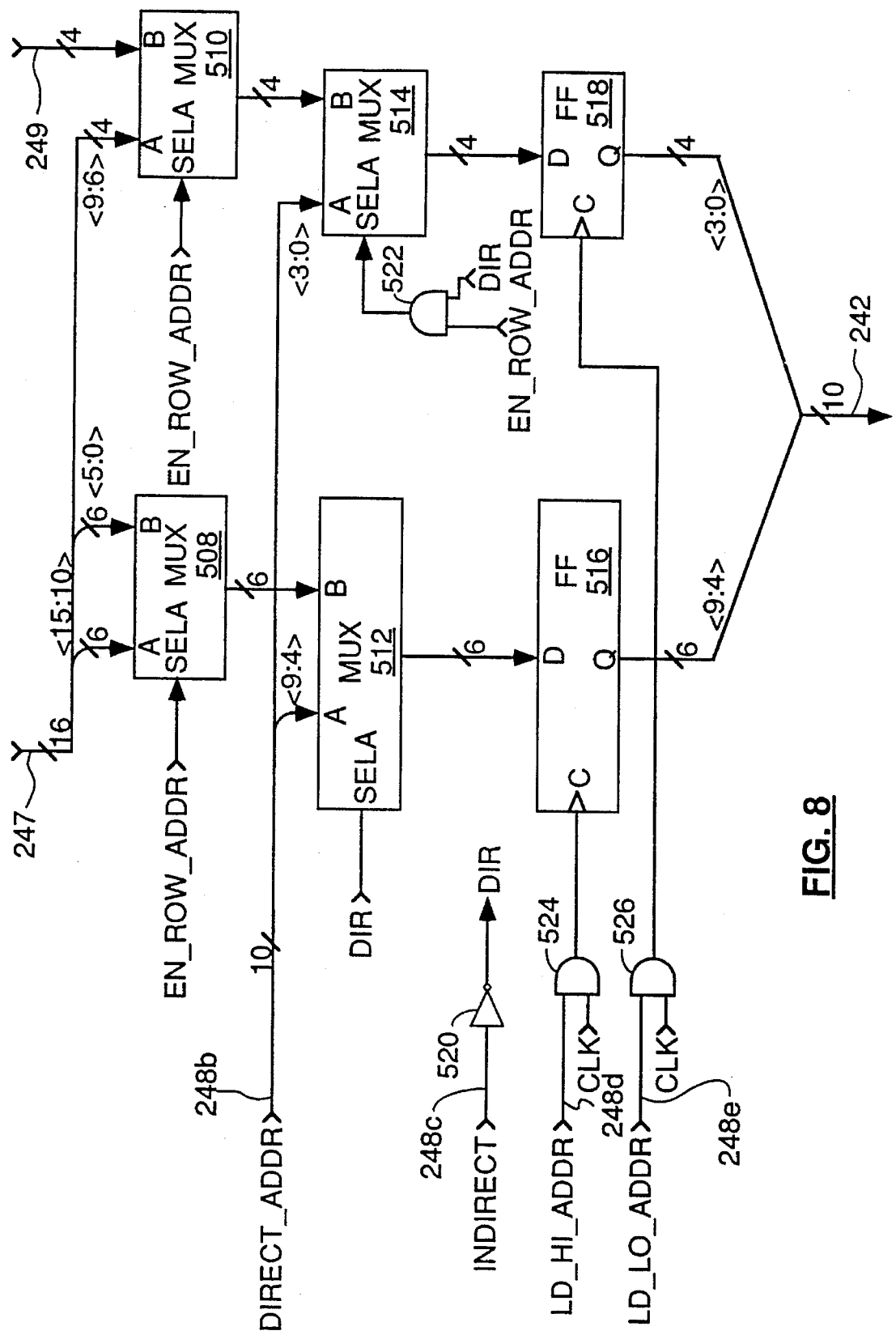
FIG. 8 is a logic schematic diagram of the address controller of FIG. 6.

The address controller 240 is shown in further detail in FIG. 8. In direct address mode, a 10-bit row or column address is present on 10-bit line 248b. In the absence of an indirect address signal on line 248c, inverter 520 furnishes a direct address signal DIR to SELA of multiplexer 512, which selects bits <9:4> of line 248b. The direct address signal DIR also is furnished to an AND gate, which in response to the DIR signal and an EN_ROW_ADDR signal (if the direct address is a row address; see FIG. 12) applied to the other input, furnishes a signal to SELA of multiplexer 514, which selects bits <3:0> of line 248b. If the direct address is a column address, multiplexer 514 selects the output of multiplexer 510, which absent an EN_ROW_ ADDR signal selects the processor identification number on line 249. The outputs of multiplexers 512 and 514 are latched by latches 516 and 518 at clock pulse CLK, in response to respectively a load high address signal LD_HI_ ADDR on line 248d (applied through clocked AND gate 524), and a load low address signal LD_LO_ADDR on line 248e (applied through clocked AND gate 526). The 6-bit output of latch 516 and the 4-bit output of latch 518 are combined on 10-bit line 242 as bits <9:4> and <3:0> respectively. When an INDIRECT signal is present on line 248c, multiplexer 512 selects the output of multiplexer 508, and multiplexer 514 selects the output of multiplexer 510. Multiplexer 508 selects either bits <15:10> or bits <5:0> of line 247 from the cluster address bus 246, depending on the state of EN_ROW_ADDR. Similarly, multiplexer 510 selects either bits <9:6> of line 247 or the PE identification number on line 249, depending on the state of EN_ROW_ADDR. The outputs of multiplexers 512 and 514 are furnished to line 242 as described above.

Figure 9:
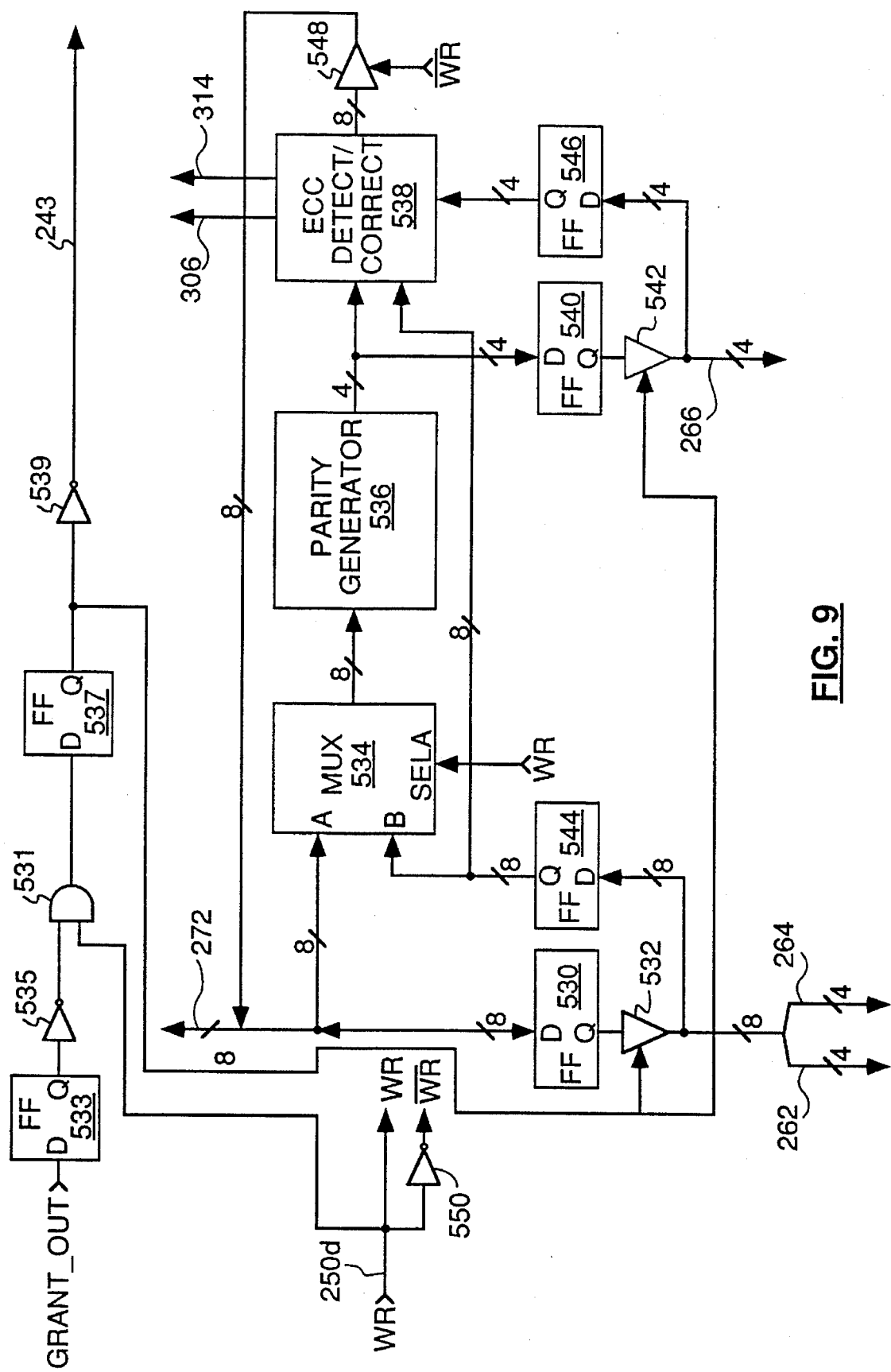
FIG. 9 is a logic schematic diagram of the error correction logic of FIG. 6.

The error correction logic 270, which is shown in further detail in FIG. 9, is active during reads from and writes to cluster memory 260. Four check bits are communicated over line 266, in association with a byte transmitted over lines 262 and 264 in two nibbles (4-bit segments). During memory writes, these check bits are generated by the ECC logic 270 from the data byte. During memory reads, these check bits are decoded by the ECC logic 270 into an ERR bit and a UNC bit.

In the event of a write to memory 260, the 8-bit data on line 272 is retained by data output latch 530 and applied to buffer 532. Buffer 532 is gated by the output of flipflop 537. The input of flipflop 537 is formed in gate 531 from the AND of signal WR and signal GRANT_OUT, the latter being applied to AND gate 531 through flipflop 533 and inverter 535. When activated, buffer 532 furnishes the data to memory 260 on lines 262 and 264, and also to data input latch 544. The 8-bit data also is selected by multiplexer 534 in response to signal WR at SELA, and provided to ECC checkbit parity generator 532. The design of a suitable parity generator 532 is well known, and is described generally in H. S. Stone, "Discrete Mathematical Structures and Their Applications," Science Research Associates, Inc., Chicago, Ill., 1973, which is incorporated herein by reference. The 4-bit output of parity generator 536 is retained by check bit output latch 540 and passed to memory 260 on line 266 through buffer 542, in response to the output of flipflop 537. The 4-bit output of parity generator 536 also is furnished to ECC detection and correction circuit 538, along with the 8-bit data from data input latch 544, and ECC circuit 538 generates an ERR-bit and an UNC-bit on lines 306 and 314 respectively. The design of a suitable ECC logic circuit 270 is well known, and is described generally in the aforementioned Stone reference, and hereby is incorporated herein by reference. An alternative implementation would use five check bits to provide double bit error detection in addition to single bit error correction on 8-bit data.

In the event of a read from memory 260, the 8-bit data on lines 262 and 264 is retained by the data input latch 544 and applied to the ECC circuit 538, along with the four corresponding check bits read from memory 260 and retained by latch 546. ECC circuit generates an ERR-bit and an UNC-bit on lines 306 and 314 respectively, and also provides 8-bit corrected data at its output. The 8-bit data is furnished to line 272 by buffer 548, in response to signal WR bar. Signal WR bar is obtained from signal WR by inverter 550.

The output of flipflop 537 is inverted by inverter 539 and furnished on line 243.

Figure 10:
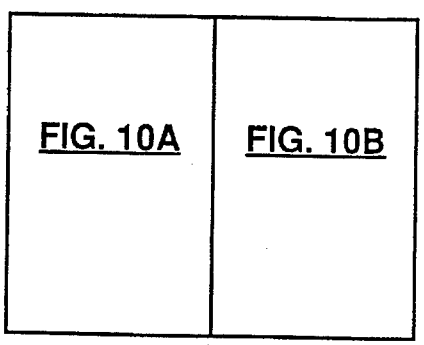
FIG. 10A and 10B are adjacent sections of a logic schematic diagram of the stage register of FIG. 4.
Figure 10A:
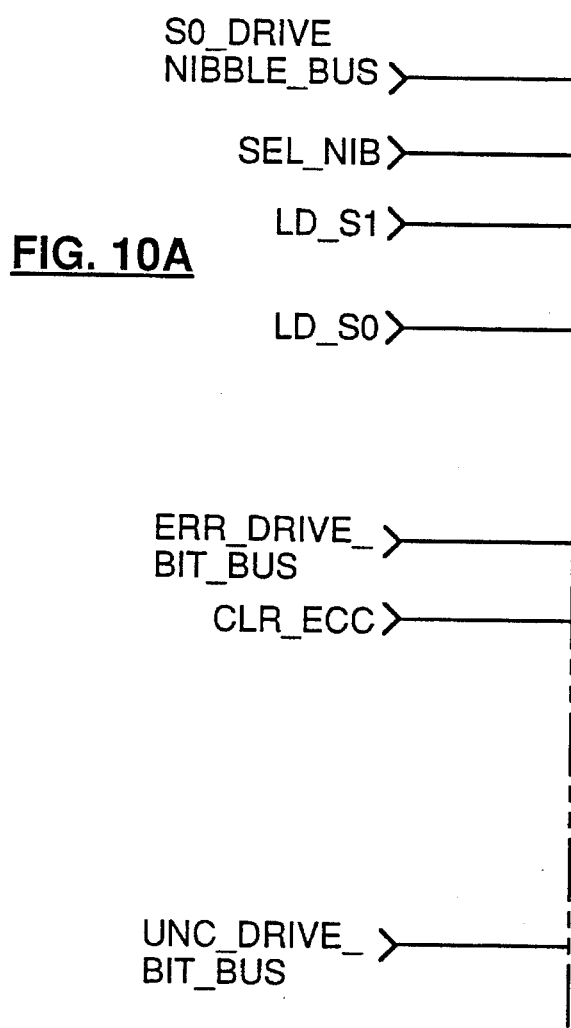
Figure 10B:
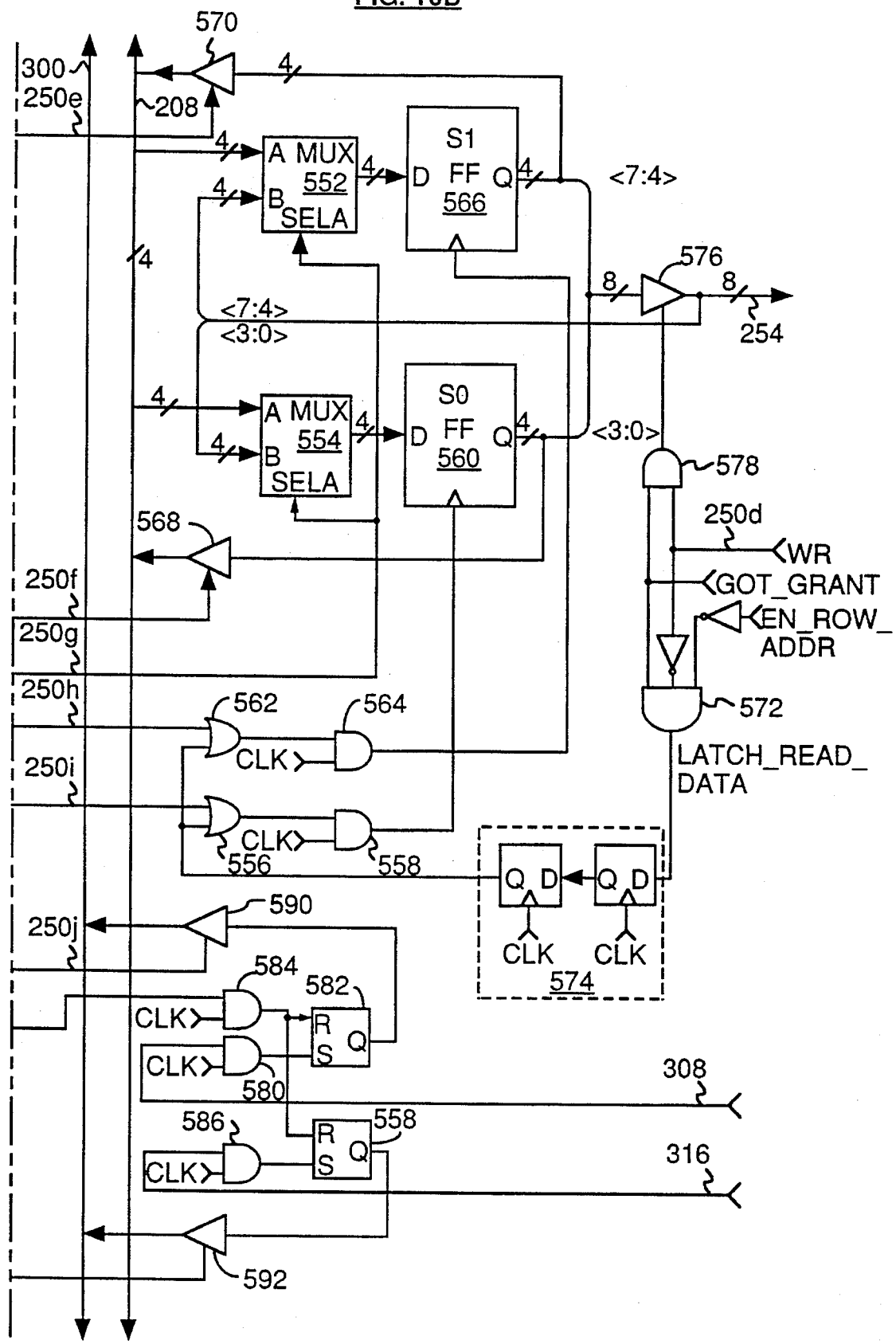

The stage register 251 and the error register 310 are shown in further detail in FIG. 10. Data is read into the stage register 251 from the APU 201 as follows. In response to a select nibble bus signal SEL_NIB on line 250g, multiplexers 552 and 554 select the 4-bits of nibble bus 208. In response to a load S0 signal LD_S0 on line 250i, which is applied through OR gate 556 and a clocked AND gate 558, S0 is retained by latch 560, thereby forming bits <3:0> of the 8-bit data. In response to a load S1 signal LD_S1 on line 250h, which is applied through OR gate 562 and a clocked AND gate 564, S1 is retained by latch 566, thereby forming bits <7:4> of the 8-bit data. Data is read from the stage register 251 to the APU 201 as follows. The output from S0 is furnished to the nibble bus 208 through buffer 568, in response to a S0_DRIVE_NIBBLE_BUS signal. The output from S1 is furnished to the nibble bus 208 through buffer 570, in response to a S1_DRIVE_NIBBLE BUS signal.

Data is read into the stage register 251 from cluster memory 260 as follows. When signal SEL_NIB is not asserted, multiplexers 552 and 554 select respectively bits <7:4> and <3:0> of line 254. When write signal WR and row signal EN ROW_ADDR (see FIG. 12) are not asserted, a grant request signal GOT_GRANT applied to the input of an AND gate forms a LATCH_READ_DATA signal at the output of the AND gate 572. The LATCH_READ_DATA signal propagates through read pipeline delay circuit 574, which comprises, for example, two clocked latches, and then is applied through OR gate 556 and clocked AND gate 558 to latch 560, and through OR gate 562 and clocked AND gate 564 to latch 566. Latches 566 and 560 then retain the output of multiplexers 552 and 554, respectively. Data is read from the stage register 251 as follows. The 4-bit outputs of latches 560 and 566 are furnished together to the 8-bit line 254 and hence to the cluster data bus 255 through buffer 576, in response to the AND of the GOT_GRANT signal and the WR signal in AND gate 578.

The ERR-bit and the UNC-bit are read into the error register 310 from respective-cluster bit busses 302 and 304, and then onto the bit bus 300, as follows. The ERR-bit on line 308 is clocked through AND gate 580 to the SET input of SR flipflop 582. The UNC-bit on line 316 is clocked through AND gate 586 to the SET input of SR flipflop 588. Both flipflops 582 and 588 are cleared when appropriate in response to clear error signal CLR_ECC, applied to their respective RESET inputs through clocked AND gate 584. When desired, the outputs of flipflops 582 and 588 are furnished to the bit bus 300 by buffers 590 and 592 respectively, in response to signals ERR_DRIVE_BIT_BUS and UNC_DRIVE_BIT_BUS respectively.

Figure 11:
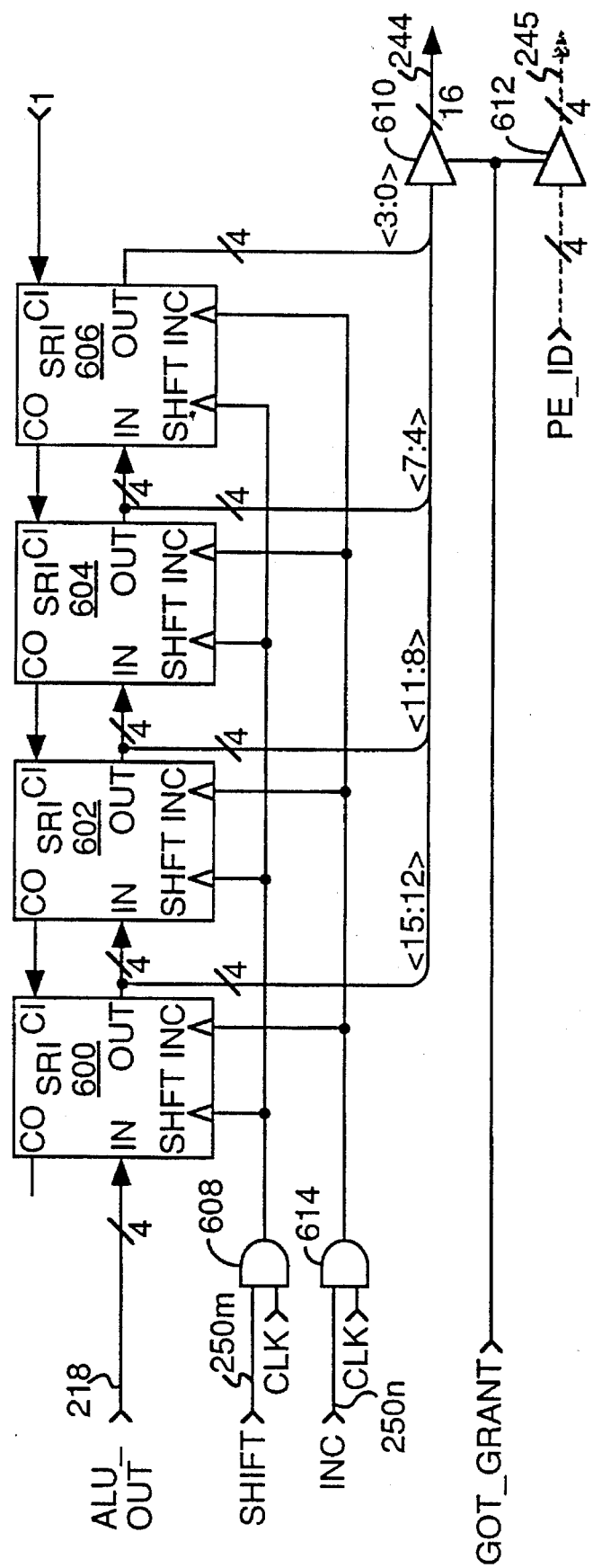
FIG. 11 is a logic schematic diagram of the exponent/address register of FIGS. 4 and 5.

The exponent/address register 206 in its function as an address register is shown in further detail in FIG. 11. The exponent/address register 206 comprises four 4-bit shift registers/incrementors 600, 602, 604 and 606. In response to a shift signal SHIFT originating on line 250m and applied through clocked AND gate 608, each shift register 600, 602, 604 and 606 data is latched and shifted. After four such cycles, the exponent/address register 206 contains a full 16-bit address, with shift register 600 having bits <15:12>, shift register 602 having <11:8>, shift register 604 having <7:4>, and shift register 606 having <3:0>. The 16-bit address is provided on line 244 by buffer 610, in response to the GOT_GRANT signal. In addition, the processor element identification number is provided on line 245 by buffer 612, in response to the GOT_GRANT signal. As previously noted, the PE_ID number may be fixed or computed locally in the processor element. The address stored in exponent/address register 206 also may be incremented in response to an INC signal applied to the increment input of each shift register 600, 602, 604 and 606 through clocked AND gate 614.

Figure 12:
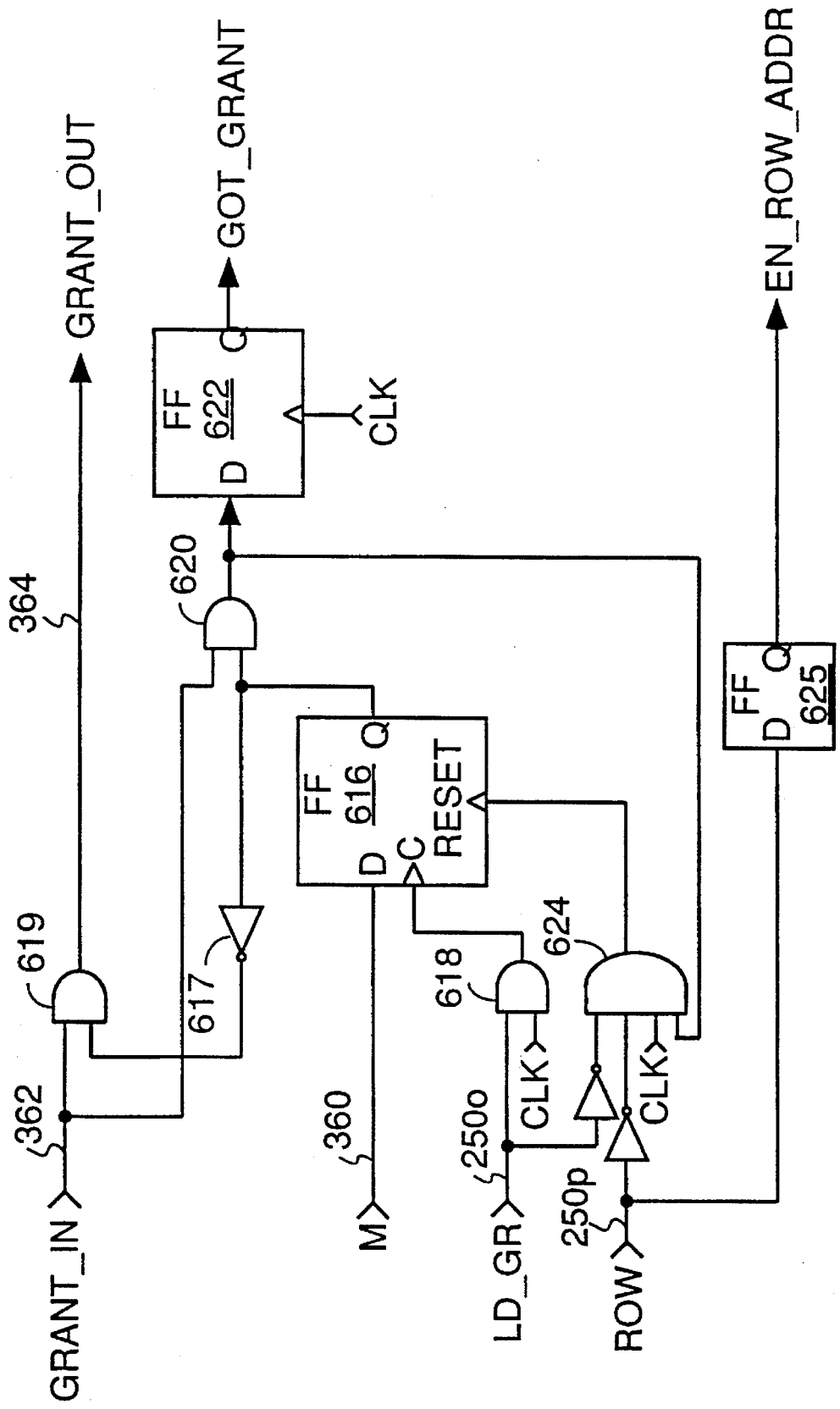
FIG. 12 is a logic schematic diagram of the grant request flag circuit of FIG. 4.

The GOT_GRANT signal originates in the grant request circuit, which is shown in further detail in FIG. 12. The M-bit 338 is copied into the GR-bit flipflop 616 in response to a load grant bit signal LD_GR on line 250o, applied to the flipflop 616 through clocked AND gate 618. Then, when a GRANT_IN signal occurs, AND gate 620 sets flipflop 622, thereby generating the GOT_GRANT signal. In addition, the output of the AND gate 620 drives the reset of flipflop 616 through clocked AND gate 624 and resets flipflop 616, provided neither a LD_GR signal nor a ROW signal is asserted. The reset output of flipflop 616 also resets flipflop 622 one cycle later through AND gate 620, and generates a GRANT_OUT signal through inverter 617 and AND gate 619, to which the GRANT_IN signal also is applied. For purposes of pipelining, signal row is delayed by flipflop 625 and furnished to other circuits as signal EN_ROW_ADDR.

Figure 13:
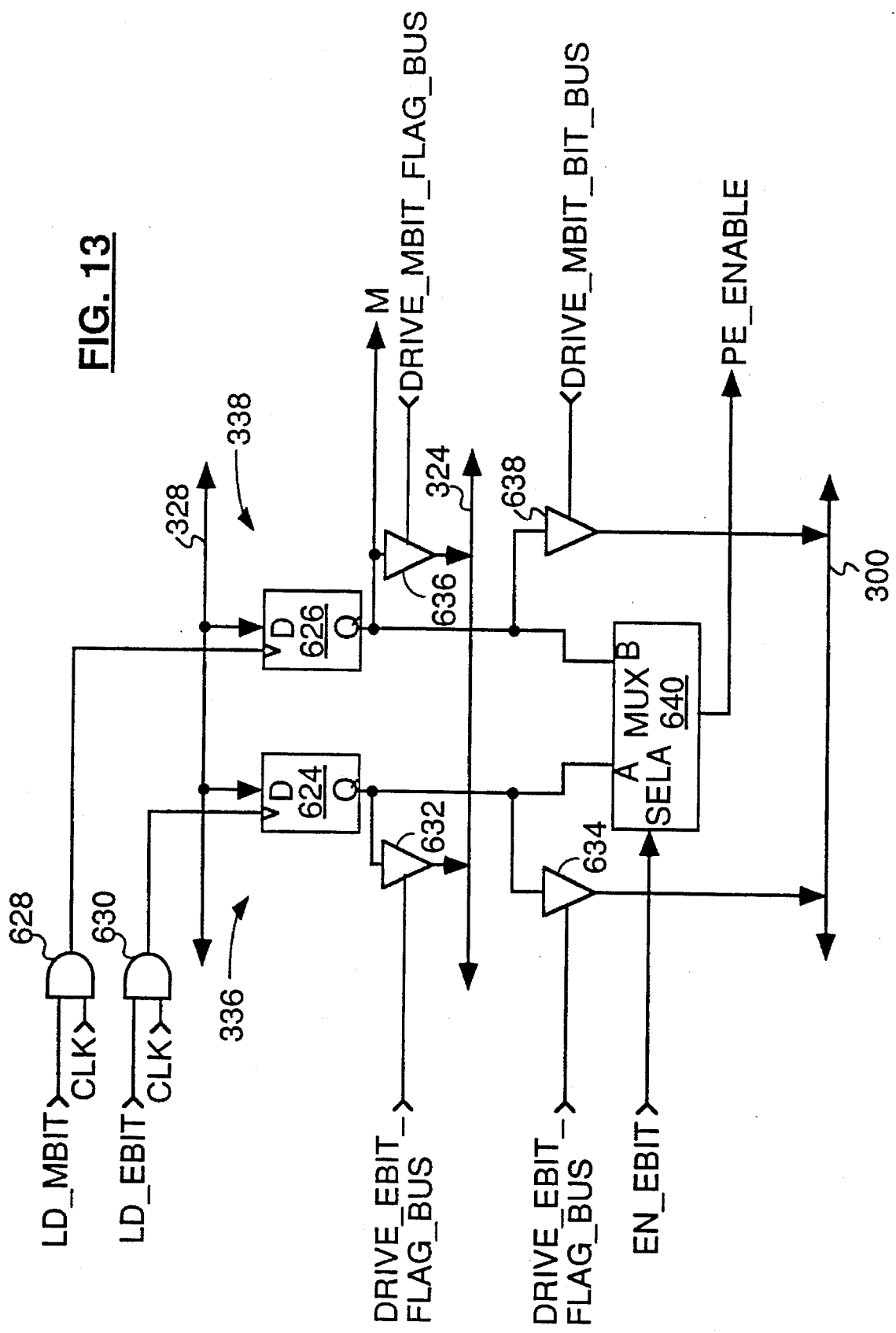
FIG. 13 is a logic schematic diagram of the E and M flag circuits of FIGS. 4 and 5.

The circuitry associated with the M-bit 338 is shown in further detail in FIG. 13. The E-bit 336 is represented at the output of flipflop 624, and the M-bit 338 is represented at the output of flipflop 626. Flipflops 624 and 626 are set/reset in accordance with the state of line 328 from BLU 320, in response to respective signals LD_EBIT and LD_MBIT applied through clocked AND gates. The output of flipflop 624 (E-bit 336) is furnished to flag bus 324 through buffer 632, in response to signal DRIVE_EBIT_FLAG BUS, and is furnished to bit bus 300 through buffer 634, in response to signal DRIVE_EBIT_BIT_BUS. The output of flipflop 626 (M-bit 338) is furnished to flag bus 324 through buffer 636, in response to signal DRIVE_MBIT FLAG BUS, and is furnished to bit bus 300 through buffer 638, in response to signal DRIVE_MBIT_BIT_BUS. The output of flipflop 626 also is furnished to grant request circuit 211 over line 360. Either E-bit 336 or M-bit 338 is selected through multiplexer 640 to enable the processor element 200, depending on whether signal EN-EBIT is asserted.

Figure 14:
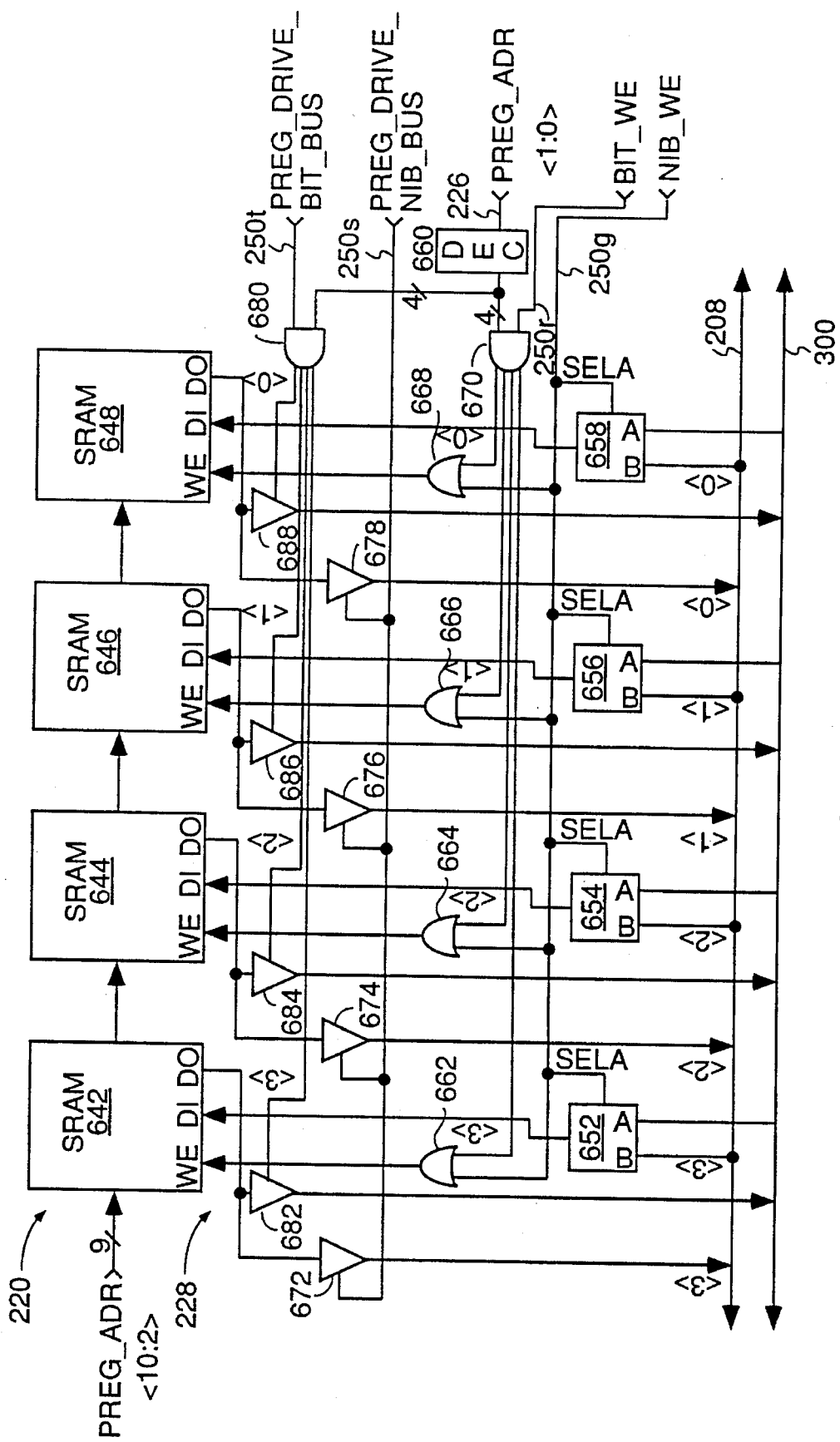
FIG. 14 is a logic schematic diagram of the PE register circuit of FIG. 5.

The PE registers 220 and PE register array controller 228 are shown in further detail in FIG. 14. PE registers 220 comprises four conventional 512×1 bit SRAM memory circuits on chip, which are addressed over 9-bit address line 225 carrying bits <10:2> of PREG_ADR.

A memory write from nibble bus 208 is made when signal NIB WE is asserted on line 250q, in accordance with which multiplexers 652, 654, 656 and 658 select bits <3>, <2>, <1> and <0> respectively of nibble bus 208 and furnish them to the data-in ("DI") inputs of SRAMs 642, 644, 646 and 648 respectively. At the same time, signal NIB_WE propagates to the write-enable ("WE") inputs of SRAMs 642,644,646 and 648 through OR gates 662,664,666 and 668 respectively. A memory write from bit bus 300 is made when signal BIT WE is asserted on line 250r. As signal NIB WE is not asserted, multiplexers 652, 654, 656 and 658 select the bit bus 300 and furnishes the bit to the data-in ("DI") inputs of SRAMs 642, 644, 646 and 648 respectively. Signal BIT_WE is applied to AND gate group 670, where it is ANDed with each of the four output lines of decoder 660 which receives as its input bits <1:0> of PREG_ADR over line 226. In accordance with the output of decoder 660, signal BIT_WE propagates to one of the write-enable ("WE") inputs of SRAMs 642, 644,646 or 648 through one of the OR gates 662, 664, 666 or 668 respectively.

A memory read to nibble bus 208 is made when signal PREG_DRIVE_NIB_BUS is asserted on line 250s, in accordance with which buffers 672, 674, 676 and 678 drive the data out ("DO") outputs of SRAMs 642, 644,646 and 648 onto the nibble bus 208 as bits <3>, <2>, <1> and <0> respectively. A memory read to the bit bus 300 is made when signal PREG DRIVE_BIT_BUS is asserted on line 250t. Signal PREG_DRIVE_BIT_BUS is applied to AND gate group 680, where it is ANDed with each of the four output lines of decoder 660 which receives as its input bits <1:0> of PREG_ADR over line 226. In accordance with the output of decoder 660, signal PREG_DRIVE_BIT_BUS propagates to one of the buffers 682, 684, 686 or 688, which drives the data out ("DO") output of the selected SRAM 642, 644, 646 or 648 onto the bit bus 300.

Figure 15:
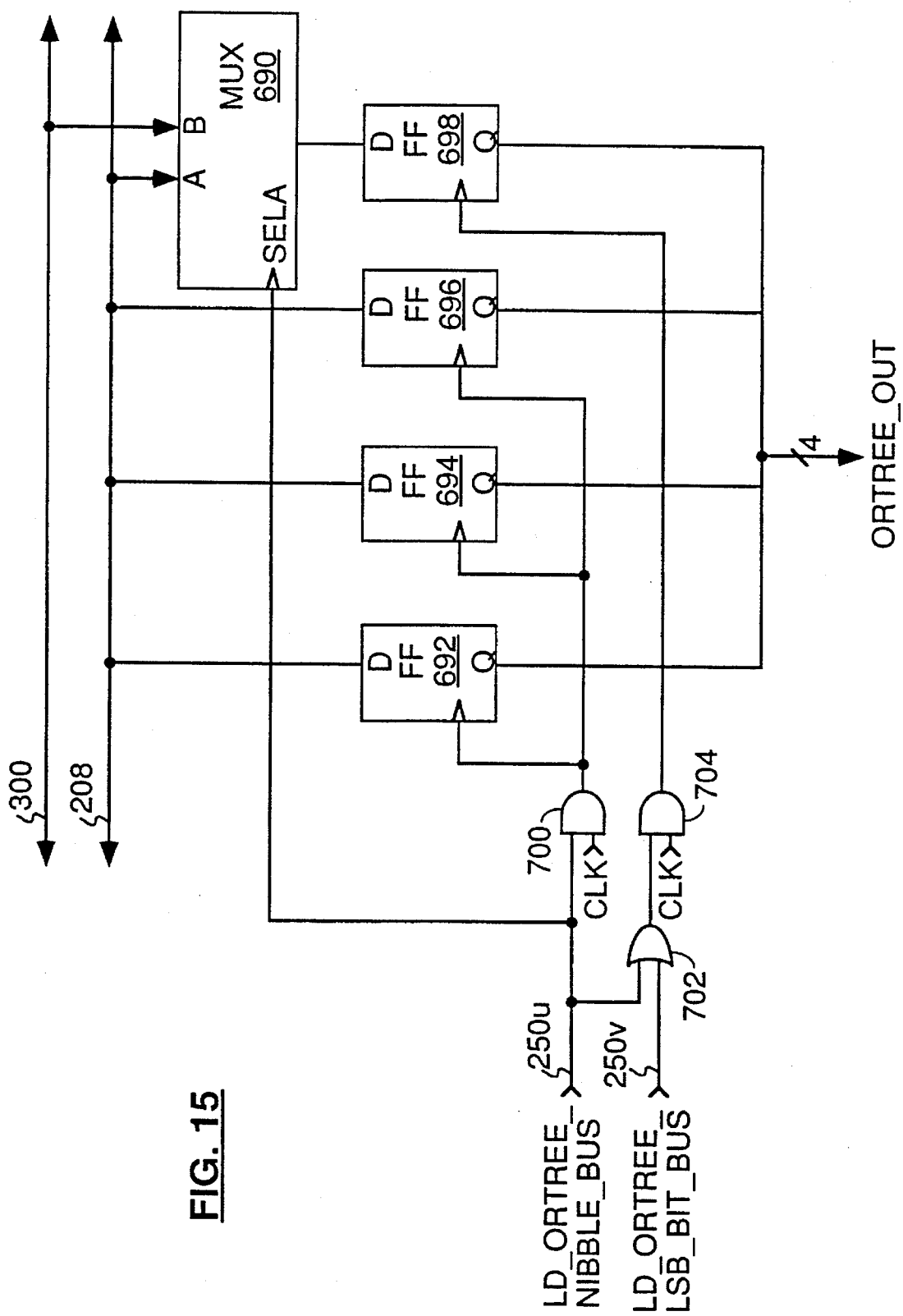
FIG. 15 is a logic schematic diagram of the OR tree latch circuit of FIG. 5.

The OR tree latch 370 is shown in further detail in FIG. 15. To latch a full nibble from nibble bus 208 out to the OR tree 372, a load signal LD_ORTREE_NIBBLE_BUS is asserted on line 250u. Signal LD_ORTREE_NIBBLE_BUS is applied to flipflops 692, 694, and 696 through clocked AND gate 700, and to flipflop 698 through OR gate 702 and clocked AND gate 704. Signal LD_ORTREE_NIBBLE_BUS also is applied to multiplexer 690, which selects bit <0> of the nibble bus 208 and provides it to flipflop 698. In response to signal LD_ORTREE_NIBBLE_BUS, flipflops 692, 694, 696 and 698 provide bits <3>, <2>, <1> and <0> respectively as ORTREE_OUT. To latch a single bit from bit bus 300, a load signal LD_ORTREE_LSB_BIT_BUS is asserted on line 250v. Signal LD_ORTREE_LSB_BIT_BUS is applied to delay flipflop 698 through OR gate 702 and clocked AND gate 704. As signal LD_ORTREE_NIBBLE_BUS is not asserted, multiplexer 690 selects bit bus 300, and flipflop 698 responds to signal LD ORTREE_LSB_BIT_BUS to provide the bit bus state on bit <0> of ORTREE_OUT.

While our invention has been described with respect to the embodiments set forth above, other embodiments and variations not described herein are within the scope of my invention. For example, our invention should not be limited to any specific word size, memory size, number of DRAMs in cluster memory, or address size. Nor should our invention be limited to any particular number of clusters, or number of processor elements per cluster. Accordingly, other embodiments and variations not described herein are to be considered within the scope of my invention as defined by the following claims.

What is claim is:

1. A method for performing a memory write operation in a parallel processor memory system that includes a processor controller, a transfer controller, a plurality of processor elements, and a memory, each of said processor elements having a processor, said method comprising the steps of:

for each of a plurality of clusters in parallel with the other of said clusters, wherein each of the clusters comprises a respective subset of the processor elements and a plurality of stage registers respectively connected to the processor elements of the subset, selecting a further subset of the processor elements therein for participation in a memory write operation;

placing said processor controller in an interrupted state; for each of said clusters in parallel with the other of said clusters, transferring data in parallel from the processor elements of said selected further subset of processor elements to the stage registers of said selected further subset of processor elements while said processor controller is in said interrupted state;

placing said processor controller in a non-interrupted state following completion of said processor-to-stage register data transferring step;

placing said transfer controller in a memory busy state following the completion of said processor-to-stage register data transferring step; for each of said clusters concurrently with the other of said clusters, transferring data sequentially from the stage registers of said selected further subset of processor elements to an associated memory while said transfer controller is in said memory bUSY state; and placing said transfer controller in a non-memory busy state following the completion of said stage register-to-memory data transferring step.

2. A method as in claim 1, wherein for each of said clusters, said selected further subset is all of the processor elements in said each cluster.

3. A method as in claim 1, wherein for each of said clusters, said selected further subset is less than all of the processor elements in said each cluster.

4. A method as in claim 1 wherein said further processor element subset selecting step comprises the step, for each of said clusters in parallel, of assigning values to respective associated data transfer enable flags of the processor elements of said each cluster for indicating which of the processor elements of said each cluster participate in said parallel data transferring step.

5. A method for performing a memory read operation in a parallel processor memory system that includes a processor controller, a transfer controller, a plurality of processor elements, and a memory, each of said processor elements having a processor, said method comprising the steps of:

for each of a plurality of clusters in parallel with the other of said clusters, wherein each of the clusters comprises a respective subset of the processor elements and a plurality of stage registers respectively connected to the processor elements of the subset, selecting a further subset of the processor elements therein for participation in a memory read operation;

placing said transfer controller in a memory busy state;

for each of said clusters concurrently with the other of said clusters, transferring data sequentially from an associated memory to the stage registers of said selected further subset of processor elements while said transfer controller is in said memory state;

placing said transfer controller in a non-memory busy state following completion of said memory-to-stage register data transferring step;

placing said processor controller in an interrupted state followinq the completion of said memory-to-stage register data transferring step;

for each of said clusters in parallel with the other of said clusters, transferring data in parallel from the stage registers of said selected further subset of processor elements to the processors of said selected further subset of processor elements while said processor controller is in said interrupted state; and placing said processor controller in a non-interrupted state following the completion of said stage register-to-processor data transferring step.

6. A method as in claim 5, wherein for each of said clusters, said selected further subset is all of the processor elements in said each cluster.

7. A method as in claim 5, wherein for each of said clusters, said selected further subset is less than all of the processor elements in said each cluster. elements of said each cluster having their respective grant request flags set and the memory associated with said each cluster.

8. A method as in claim 5 wherein said further processor element subset selecting step comprises the step, for each of said clusters in parallel, of assigning values to respective associated data transfer enable flags of the processor elements of said each cluster for indicating which of the processor elements of said each cluster participate in said parallel data transferring step.

\* \* \* \* \*